United States Patent
Hays et al.

(10) Patent No.: US 9,764,592 B1
(45) Date of Patent: Sep. 19, 2017

(54) RING GEAR AND BRAKE FOR CENTERLESS WHEEL

(71) Applicant: Orbis Wheels, Inc., Mill Valley, CA (US)

(72) Inventors: Marcus G. Hays, San Rafael, CA (US); Scott Streeter, Santa Rosa, CA (US); Benjamin Lorimore, Portland, OR (US); Gary Leo, Fairfax, CA (US)

(73) Assignee: ORBIS WHEELS, INC., Mill Valley, CA (US)

( * ) Notice: Subject to any disclaimer, the term of this patent is extended or adjusted under 35 U.S.C. 154(b) by 0 days.

(21) Appl. No.: 15/336,540

(22) Filed: Oct. 27, 2016

(51) Int. Cl.
| | | |
|---|---|---|
| *B60B 19/00* | (2006.01) | |
| *F16H 55/17* | (2006.01) | |
| *B60B 21/00* | (2006.01) | |
| *B60B 25/00* | (2006.01) | |
| *B60B 21/08* | (2006.01) | |

(52) U.S. Cl.
CPC .............. *B60B 19/00* (2013.01); *B60B 21/00* (2013.01); *B60B 21/08* (2013.01); *B60B 25/00* (2013.01); *F16H 55/17* (2013.01); *B60B 2310/00* (2013.01); *B60B 2380/00* (2013.01); *F16H 2055/176* (2013.01)

(58) Field of Classification Search
CPC ......... B60B 19/00; B60B 3/048; B60B 21/02; F16H 55/17; F16H 2055/176
See application file for complete search history.

(56) References Cited

U.S. PATENT DOCUMENTS

| | | | | |
|---|---|---|---|---|
| 1,819,924 | A * | 8/1931 | Seppola | B60K 17/043 180/10 |
| 5,507,370 | A * | 4/1996 | White | F16D 65/10 188/264 G |
| 6,224,080 | B1 * | 5/2001 | Ross | B60B 3/048 280/260 |
| 9,440,488 | B1 | 9/2016 | Mothafar | |
| 2004/0036248 | A1 | 2/2004 | Karpman | |
| 2007/0209855 | A1 | 9/2007 | Burkiewicz | |
| 2007/0261929 | A1 | 11/2007 | Hsu et al. | |
| 2012/0024613 | A1 | 2/2012 | Souvanny | |

(Continued)

OTHER PUBLICATIONS

Arjit, "How do hubless/centreless wheel work?", Published on Jan. 5, 2015, accessed at https://www.quora.com/How-do-hubless-centreless-wheel-work, pp. 5.

(Continued)

*Primary Examiner* — Brian Swenson
(74) *Attorney, Agent, or Firm* — Maschoff Brennan

(57) ABSTRACT

The present disclosure may relate to centerless wheel assembly that includes a centerless rim including a first center point laying in a first plane generally defined by the centerless rim. The centerless wheel assembly may also include a centerless ring gear coupled to the centerless rim such that rotation of the centerless ring gear causes a corresponding rotation of the centerless rim. The centerless ring gear may include a second center point laying in a second plane generally defined by the centerless ring gear, and the first plane may be generally parallel to the second plane. Additionally, the centerless ring gear may be shaped to interface with a drive gear that drives the centerless ring gear.

19 Claims, 25 Drawing Sheets

(56) References Cited

U.S. PATENT DOCUMENTS

2015/0093956 A1     4/2015   Mielniczek
2015/0273937 A1*   10/2015   Johnson .................. B60B 19/00
                                                                                                     301/6.1

OTHER PUBLICATIONS

Martin, "Hubless Mountain Bike Mechanism", Published on Aug. 9, 2012, accessed at https://www.youtube.com/watch?v=GkD9fS7TkWU, pp. 3.
SkeptiKal, "Cyclone—The One Wheeler", Published on Jul. 6, 2012, accessed at http://letsmakerobots.com/node/33308, pp. 4.
International Search Report dated Feb. 6, 2017 as received in Application No. PCT/US2016/059222.
Written Opinion of the International Searching Authority dated Feb. 6, 2017 as received in Application No. PCT/US2016/059222.

* cited by examiner

RING GEAR AND BRAKE FOR CENTERLESS WHEEL

FIELD

The embodiments discussed in the present disclosure relate to a ring gear and a brake for a centerless wheel.

BACKGROUND

Some wheels have spokes made of tensioned, adjustable metal wires, or some other connecting body between the edge and the middle of the wheel. The spokes may connect a rim of a particular wheel to a hub of the particular wheel and may help support an applied load. Wheels with tensioned spokes may be used in bicycles, wheelchairs, motorcycles, automobiles, and other vehicles.

The subject matter claimed in the present disclosure is not limited to embodiments that solve any disadvantages or that operate only in environments such as those described above. Rather, this background is only provided to illustrate one example technology area where some embodiments described may be practiced.

SUMMARY

In one or more embodiments of the present disclosure, the present disclosure may relate to centerless wheel assembly that includes a centerless rim including a first center point laying in a first plane generally defined by the centerless rim. The centerless wheel assembly may also include a centerless ring gear coupled to the centerless rim such that rotation of the centerless ring gear causes a corresponding rotation of the centerless rim. The centerless ring gear may include a second center point laying in a second plane generally defined by the centerless ring gear, and the first plane may be generally parallel to the second plane. Additionally, the centerless ring gear may be shaped to interface with a drive gear that drives the centerless ring gear.

In accordance with one or more centerless wheel assemblies of the present disclosure, the centerless wheel assembly may include a roller guide shaped and configured to roll along the centerless rim.

In accordance with one or more centerless wheel assemblies of the present disclosure, the centerless rim may include a rail extending towards the first center point.

In accordance with one or more centerless wheel assemblies of the present disclosure, a profile of the roller guide may match a profile of the centerless rim.

In accordance with one or more centerless wheel assemblies of the present disclosure, the roller guide may be shaped to leave a gap between the roller guide and the rail during normal rotation of the centerless wheel assembly.

In accordance with one or more centerless wheel assemblies of the present disclosure, the centerless wheel assembly may include an exoskeleton plate including a first portion and a second portion, the roller guide supported by a shaft acting as an axle for the roller guide, the shaft spanning between the first portion and the second portion of the exoskeleton plate.

In accordance with one or more centerless wheel assemblies of the present disclosure, the centerless wheel assembly may include a tire coupled to the centerless rim and concentric with the centerless rim, the tire shaped and configured to contact and roll along ground and the centerless gear shaped and configured to not contact the ground during normal rotation of the centerless wheel assembly.

In accordance with one or more centerless wheel assemblies of the present disclosure, the centerless wheel assembly may include one or more bolts coupling the centerless ring gear to the centerless rim.

In accordance with one or more centerless wheel assemblies of the present disclosure, the centerless wheel assembly may include a bushing around at least one of the one or more bolts, the bushing allowing motion between the centerless ring gear and the centerless rim based on imperfections in circularity in one of the centerless rim and the centerless ring gear.

In accordance with one or more centerless wheel assemblies of the present disclosure, the centerless ring gear may be offset from the centerless rim in a direction parallel to the first plane to account for imperfections in circularity in one of the centerless rim and the centerless ring gear.

In accordance with one or more centerless wheel assemblies of the present disclosure, the offset may be located at a place along a circumference of the centerless rim corresponding to a greatest imperfection in circularity and a size of the offset corresponds to a size of the greatest imperfection in circularity.

In accordance with one or more centerless wheel assemblies of the present disclosure, the first center point and the second center point lie on a line that is approximately perpendicular to the first plane.

In accordance with one or more centerless wheel assemblies of the present disclosure, the centerless gear may include teeth facing a direction generally perpendicular to the first plane.

In accordance with one or more centerless wheel assemblies of the present disclosure, the centerless gear may include teeth facing a direction pointing generally along the first plane.

In accordance with one or more centerless wheel assemblies of the present disclosure, the centerless gear may include a helical gear.

In accordance with one or more centerless wheel assemblies of the present disclosure, the centerless wheel assembly may include a brake rotor coupled to the centerless rim.

In accordance with one or more centerless wheel assemblies of the present disclosure, the brake rotor may be on an opposite side of the centerless rim from the centerless ring gear.

In accordance with one or more centerless wheel assemblies of the present disclosure, the brake rotor may include a third center point and define a third plane generally parallel to the first plane, and the first center point and the third center point may lie on a line that is approximately perpendicular to the first plane.

In accordance with one or more centerless wheel assemblies of the present disclosure, the centerless ring gear and the brake rotor may be part of a single body.

In accordance with one or more centerless wheel assemblies of the present disclosure, the centerless rim may be composed of a material to function as a heat sink to dissipate heat away from the centerless ring gear.

In accordance with one or more centerless wheel assemblies of the present disclosure, the centerless wheel assembly may include a drive mechanism coupled to the centerless ring gear.

In accordance with one or more centerless wheel assemblies of the present disclosure, the drive mechanism may include a manually powered drive gear.

In accordance with one or more centerless wheel assemblies of the present disclosure, the drive mechanism may include a drive gear coupled to one of a motor and an engine.

One or more embodiments of the present disclosure may include a method of manufacturing a centerless wheel assembly. The method may include locating a point along a circumference of a centerless rim that represents a location of imperfection in circularity of the centerless rim. The method may also include determining an offset amount that corresponds to the imperfection in circularity of the centerless rim at the point, and coupling a centerless ring gear to the centerless rim offset from a center point of the centerless rim by the offset amount and in a direction running from the center point to the point.

In accordance with one or more methods of the present disclosure, the point may represent a greatest point of imperfection in circularity of the centerless rim.

In accordance with one or more methods of the present disclosure, coupling the centerless ring gear to the centerless rim may include attaching the centerless ring gear to the centerless rim via one or more bushings that are configured to allow movement between the centerless ring gear and the centerless rim caused by imperfections in circularity in the centerless rim.

In accordance with one or more methods of the present disclosure, the method may also include coupling a tire to the centerless rim prior to locating the point along the circumference of the centerless rim, and the location of imperfection in circularity of the centerless rim may include imperfections in circularity in the tire.

In accordance with one or more methods of the present disclosure, the offset amount may be approximately half the distance between an expected point along the circumference of the centerless rim for perfect circularity and an actual point along the circumference of the centerless rim due to imperfections in circularity.

One or more embodiments of the present disclosure may include a centerless wheel assembly that includes a centerless rim, and a centerless ring gear coupled to the centerless rim such that rotation of the centerless ring gear causes a corresponding rotation of the centerless rim, where the centerless ring gear may be generally parallel to the centerless rim. The centerless wheel assembly may also include a plurality of bushings between the centerless rim and the centerless ring gear to allow movement between the centerless rim and the centerless ring gear, and an exoskeleton plate with a first portion and a second portion. The centerless wheel assembly may additionally include a roller guide shaped to roll along the centerless rim and suspended between the first portion and the second portion of the exoskeleton plate, and a drive gear interfaced with the centerless ring gear, the drive gear coupled to the exoskeleton plate.

The object and advantages of the present disclosure will be realized and achieved at least by the elements, features, and combinations particularly pointed out in the claims.

It is to be understood that both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to a centerless wheel assembly that may include a centerless rim and a ring gear coupled to the centerless rim. In some embodiments, the ring gear may have a comparable size and orientation as the centerless rim. The ring gear may be driven by a drive gear (for example, a small gear coupled to a motor to drive the larger ring gear). As the ring gear is driven, the centerless rim is also driven because of the coupling of the ring gear to the centerless rim. The centerless wheel assembly may also include an exoskeleton plate that may support one or more roller guides that roll along the centerless rim. The exoskeleton plate may also support the motor. In some embodiments, the centerless wheel assembly may have a void of material in the middle of the wheel assembly, at least in part because the centerless rim, the ring gear, and/or the exoskeleton plate may also have voids of material in their respective middles. In these and other embodiments, the ring gear may be coupled to the centerless rim in a way to account for imperfections in circularity in the centerless rim and/or an associated tire.

Additionally, the present disclosure relates to a centerless wheel assembly that that may include a brake rotor or other braking surface coupled to the centerless rim.

Some embodiments of centerless wheel assemblies described in the present disclosure may have one or more of the following advantages: simplicity, low weight, low cost, low rotational friction, stable thermal properties, aerodynamic, and improved gear efficiencies. Centerless wheel assemblies in accordance with one or more embodiments may be used on any number of vehicles or transportation devices, including, for example, vehicles with any number of wheels, self-propelled vehicles, manually powered vehicles, motorized vehicles, mobility-aiding vehicles, cars, wheelchairs, etc. The centerless wheel assemblies may be used to transport people and/or goods. The centerless wheel assemblies may be similar to and/or share certain characteristics with the centerless wheel assemblies described in U.S. application Ser. No. 15/146,729, hereby incorporated by reference in its entirety.

Embodiments of the present disclosure are explained with reference to the accompanying drawings.

Figure 1A:
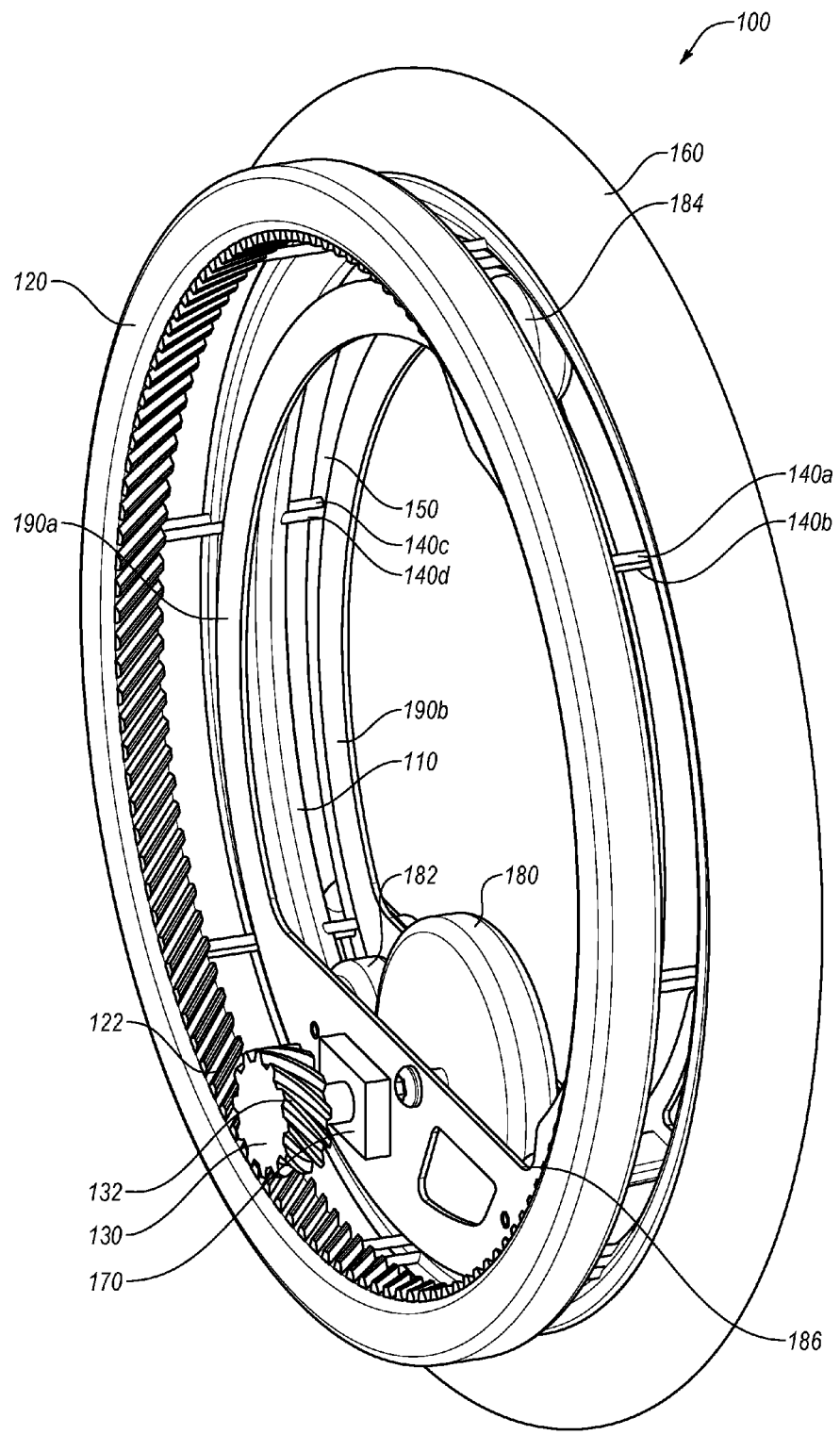
FIG. 1A illustrates a perspective view of an example centerless wheel assembly.
Figure 1B:
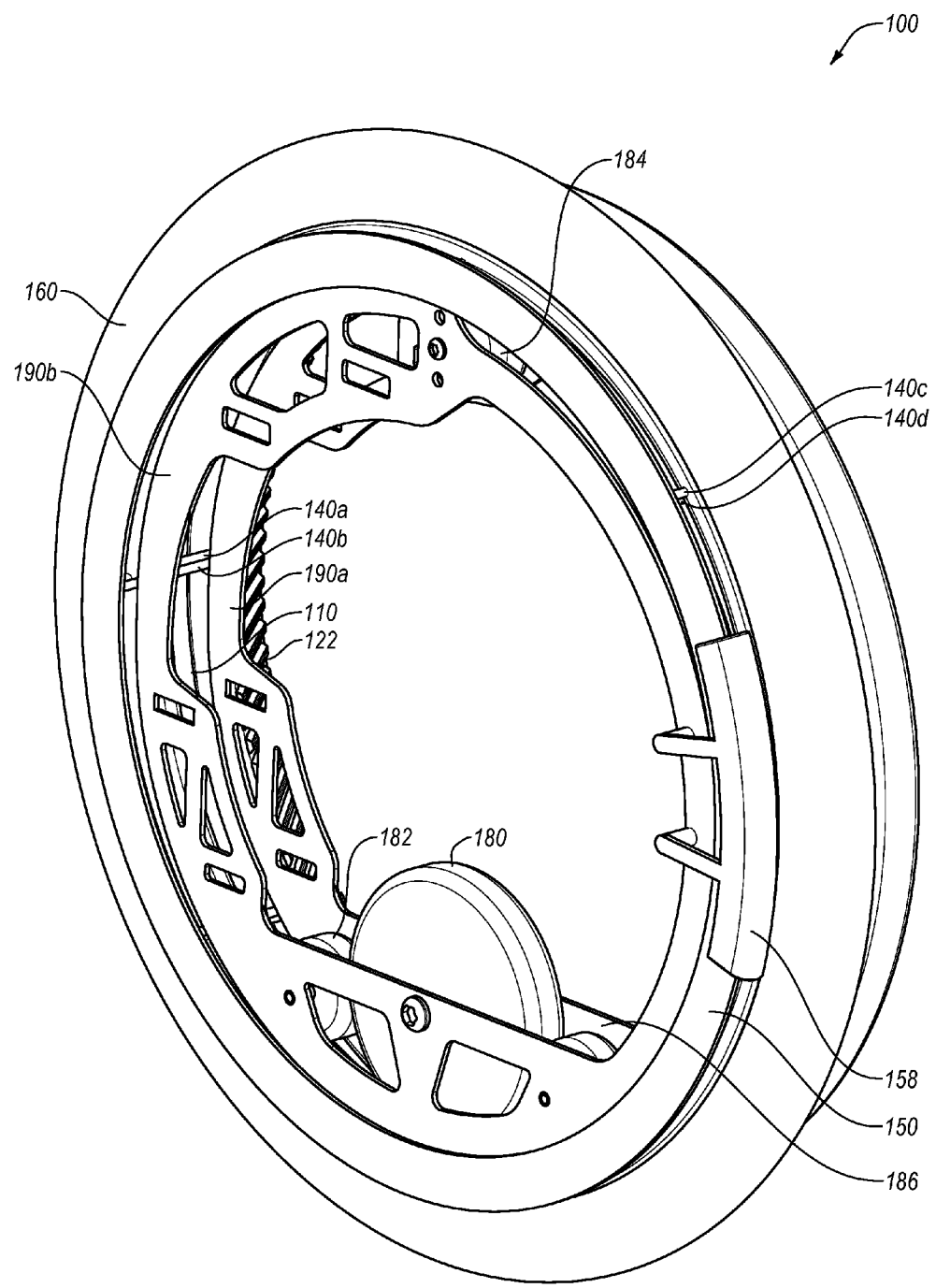
FIG. 1B illustrates an alternative perspective view of the example centerless wheel assembly of FIG. 1A.
Figure 2:
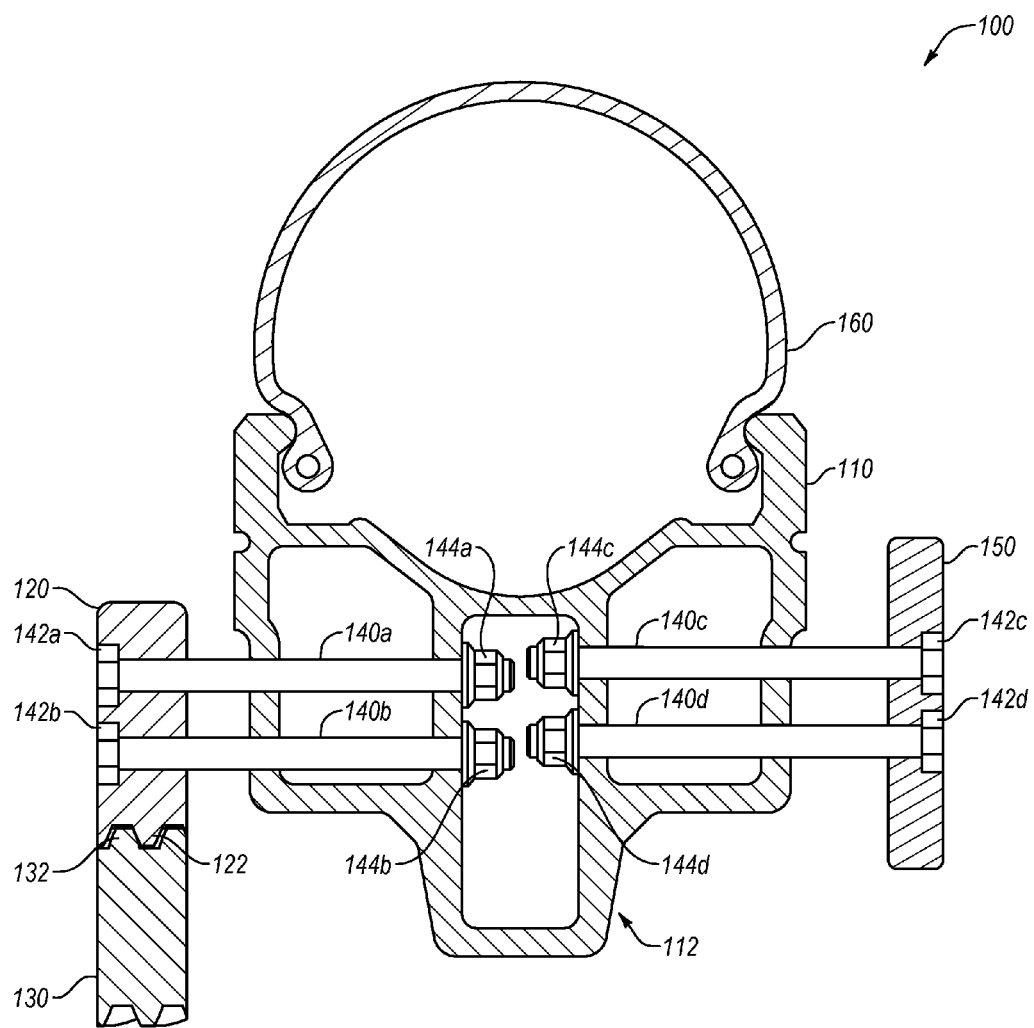
FIG. 2 illustrates a cross sectional view of a portion of the centerless wheel assembly of FIG. 1.

FIG. 1 illustrates a perspective view of an example centerless wheel assembly 100, in accordance with one or more embodiments of the present disclosure. FIG. 2 illustrates a cross sectional view of a portion of the centerless wheel assembly of FIG. 1. As illustrated in FIGS. 1 and 2, the centerless wheel assembly 100 may include a centerless rim 110 and a ring gear 120 coupled to the centerless rim 110. The ring gear 120 may interface with a drive gear 130. The drive gear 130 may rotate and cause the ring gear 120 to rotate. Rotation of the ring gear 120 may cause a corresponding rotation of the centerless rim 110.

The centerless rim 110 may include any shape or profile. In addition to those illustrated in the present disclosure, a few additional example profiles of centerless rims are illustrated in U.S. application Ser. No. 15/146,729, hereby incorporated by reference in its entirety. In some embodiments, the centerless rim 110 may include a profile such that one or more roller guides (such as a first roller guide 180, a second roller guide 182, a third roller guide 184, and a fourth roller guide 186) may roll along the centerless rim 110. In these and other embodiments, the centerless rim 110 may include a rail 112 that may function to maintain contact between a roller guide and the centerless rim 110 and/or may otherwise prevent the roller guide from derailing. The roller guides may function to maintain the drive gear 130 and the ring gear 120 in consistent engagement such that the drive gear 130 may drive the ring gear 120.

The ring gear 120 may interface with the drive gear 130 such that as the drive gear 130 is rotated the drive gear 130 causes a corresponding rotation of the ring gear 120. Rotation of the ring gear 120 may cause a corresponding rotation of the centerless rim 110 to which the ring gear 120 may be coupled. The ring gear 120 may include teeth 122. Additionally or alternatively, the ring gear 120 may include sprockets, spurs, etc., or any other suitable element. In some embodiments, the teeth 122 may run along the inner diameter of the ring gear 120. The ring gear 120 and/or the teeth 122 may be implemented as a helical gear (left- or right-handed), a double helical gear, a spur gear, an internal ring gear, a face gear, a planetary gear, etc. In these and other embodiments, the teeth 122 of the ring gear 120 may interface with teeth 132 of the drive gear 130. The teeth 132 and/or the drive gear 130 may be implemented in a similar manner as that described for the teeth 122 and/or the ring gear 120, but may be implemented in a different manner. For example, the drive gear 130 may be implemented with teeth 132 as helical teeth and the ring gear 120 may be implemented as an internal gear with teeth 122 implemented as helical teeth.

In some embodiments, the ring gear 120 may be coupled to the centerless rim 110 via one or more bushings. For example, in the illustrated embodiment, bushings 140a, and 140b, are labeled (referred to generally as "gear bushings 140") but as can be seen from FIG. 1, other bushings not explicitly discussed or labeled may also be included . . . . One or more of the gear bushings 140 may allow for a certain amount of movement between the centerless rim 110 and the ring gear 120. For example, if there are imperfections in circularity in the centerless rim 110 and/or an attached tire 160, the gear bushings 140 may allow for some movement between the centerless rim 110 and the ring gear 120 such that any misalignment in circularity does not bend or break components of the centerless wheel assembly 100. For example, the gear bushings 140 may be made of a rubber, synthetic rubber, polyurethane, etc., such that a compressible and deformable material is between the two metal components of the centerless rim 110 and the ring gear 120. The material of the gear bushings 140 may absorb or otherwise dampen vibration or other motion between the centerless rim 110 and the ring gear 120. As illustrated in FIG. 2, in these and other embodiments, the centerless wheel assembly 100 may include bolts 142a and/or 142b that may bolt the ring gear 120 to the centerless rim 110. In these and other embodiments, the bolts 142a and 142b may pass through the bushings 140a and 140b respectively. The bushings 140a and/or 140b may be threaded or may include space for the bolts to pass through. In some embodiments, the bushings 140a and 140b and/or the bolts 142a and 142b may pass through one or more channels or gaps in material in the centerless rim 110. The bolts 142a and 142b may be held in place by nuts 144a and 144b, respectively. While FIGS. 1 and 2 illustrate nuts 144a and 144b and bolts 142a and 142b, any other connection mechanism may be used to couple the ring gear 120 to the centerless rim 110, such as screws, rivets, welding, brazing, adhesives, etc. Furthermore, anywhere in the present disclosure where bolts are illustrated or described as being used, any other connection mechanism may be used, such as screws, rivets, welding, brazing, adhesives, etc.

As used in the present disclosure, reference to imperfections in circularity may include any deviation from any source or in any direction from a perfectly circular, perfectly cylindrical, etc. shape. For example, imperfections in circularity may include an oblong, ovaloid, ovoid, etc. shape. As an additional example, imperfections in circularity may include a portion of a circular-based component with more material in one part of the component (e.g., in an extruded component). As another example, imperfections in circularity may include an uneven distribution in weight about a circular-based component. In these and other embodiments, such an imperfection may be of any magnitude. In some embodiments, imperfections in circularity may occur when a wheel assembly is rotated, for example due to the wheel compressing against the ground. As another example, imperfections in circularity may be due to variations in temperature or other weather conditions, or due to manufacturing errors, imperfections that may result in dynamic run out, or eccentricity caused by damage in various states of utilization. In some embodiments, a portion of imperfection in circularity may be identified by rotating a circular-based component.

In some embodiments, the imperfection in circularity may be determined and the ring gear 120 may be attached in a manner offset from the middle of the wheel assembly 100 to alleviate imperfections in circularity. Examples of such an embodiment may be illustrated with reference to FIGS. 5A-5C and FIG. 9.

In some embodiments, the ring gear 120 may have a similar or comparable circumference and/or orientation to the centerless rim 110. Additionally or alternatively, the ring gear 120 may have a circumference smaller than the centerless rim 110. Additionally or alternatively, the ring gear 120 may have a circumference larger than the centerless rim 110 and/or smaller than the largest circumference of the tire 160.

In some embodiments, the centerless wheel assembly 100 may include a brake rotor 150. The brake rotor 150 may be part of a disc brake system associated with the centerless wheel assembly 100. The brake rotor 150 may be used to slow down and/or stop the centerless wheel assembly 100. The brake rotor 150 may be coupled to the centerless rim 110 in a similar or comparable way that the ring gear 120 is coupled to the centerless rim 110. For example, the brake rotor 150 may be bolted to the centerless rim 110 using bolts 152*a* and 152*b* and nuts 154*a* and 154*b*. Additionally or alternatively, the coupling between the brake rotor 150 and the centerless rim 110 may utilize brake bushings 156 (such as the brake bushings 156*a* and 156*b*). As with the gear bushings 140, the brake bushings 156 may allow for some movement between the brake rotor 150 and the centerless rim 110. For example, there may be imperfections in circularity in one of the centerless rim 110 and/or the brake rotor 150 and the brake bushings 156 may allow for movement between the centerless rim 110 and the brake rotor 150 as the wheel assembly 100 is rotated. For example, the brake bushings 156 may be made of a rubber, synthetic rubber, polyurethane, etc., such that a compressible and/or elastically deformable material is between the two rigid components of the centerless rim 110 and the brake rotor 150. The material of the brake bushings 156 may absorb or otherwise dampen vibration or other motion between the centerless rim 110 and the brake rotor 150.

The wheel assembly 100 may include a brake caliper 158. The brake caliper 158 may be any component designed and/or shaped to interface with the brake rotor 150. In particular, the brake caliper 158 may be sized and/or shaped such that the brake rotor 150 rotates freely within the brake caliper 158 with generally parallel faces between the brake rotor 150 and the brake caliper 158 while the brake caliper 158 remains fixed relative to the rotating brake rotor 150. When the brake caliper 158 is actuated or otherwise invoked, the brake caliper 158 may be caused to constrict or otherwise move or deform such that the generally parallel face of the brake caliper 158 contacts the brake rotor 150. Friction between the two generally parallel faces causes the brake rotor 150 to slow down and at some point, stop rotating. The brake caliper 158 may include a pad or other material made to be worn down as part of the face generally parallel with the face of the brake rotor 150.

In some embodiments, the brake caliper 158 may be placed in a position to facilitate improved aerodynamic performance and braking performance. For example, analogizing the wheel assembly 100 to a clock face, the brake caliper 158 may be placed at a three o'clock position, with a forward direction of travel for the wheel assembly 100 being towards three o'clock. In these and other embodiments, the brake caliper 158 may be at a leading edge rather than a trailing edge of the wheel assembly 100. Placing the brake caliper 158 at the leading edge may improve aerodynamic performance of the wheel assembly 100 by having a profile that emphasizes the leading edge and a narrower trailing edge.

Additionally or alternatively, placing the brake caliper 158 at the three o'clock position may improve braking performance. For example, as the brake caliper 158 is constricted so as to contact the brake rotor 150, inertia of the moving wheel assembly 100 may cause weight bias to shift towards the front of the wheel assembly 100. The braking forces of the brake caliper 158 contacting the brake rotor 150 and the shift in weight bias may cause the wheel assembly 100 to chatter and oscillate side to side. If the brake caliper 158 is located at a twelve o'clock position without a roller guide nearby, the braking forces may cause a twisting effect on the wheel assembly 100 as a result of the distance between the brake caliper 158 and the roller guide 186. By placing the brake caliper 158 nearer the roller guide 186, the braking forces may be dampened by the proximity of the brake caliper 158 to the roller guide 186. In some embodiments, the brake caliper 158 may be placed at a nine o'clock position (e.g., proximate a roller guide at the trailing edge of the wheel assembly 100). By placing the brake caliper 158 at the trailing edge, the twisting, oscillating, and/or chatter from the braking forces may be addressed but the wheel assembly 100 may not enjoy the same aerodynamic benefits.

In some embodiments, imperfection in circularity may be determined and the brake rotor 150 may be attached in a manner offset from the middle of the wheel assembly 100 to alleviate imperfections in circularity. Examples of such an embodiment may be illustrated with reference to FIGS. 5*a*-5C and 8, and while described with reference to the ring gear 120, the same principles may be utilized in attaching the brake rotor 150 to the centerless rim 110.

In some embodiments, the wheel assembly 100 may include the ring gear 120 and not include the brake rotor 150 and the brake caliper 158. Additionally or alternatively, the wheel assembly 100 may include the brake rotor 150 and the brake caliper 158 and may not include the ring gear 120. In some embodiments as illustrated in FIGS. 1A and 1B, the wheel assembly 100 may include both the ring gear 120 and the brake rotor 150. In these and other embodiments, either or both of the ring gear 120 and the brake rotor 150 may be attached in a manner offset from the middle of the wheel assembly 100 to alleviate imperfections in circularity In some embodiments, the wheel assembly 100 may include the tire 160 coupled to the centerless rim 110. In these and other embodiments, imperfections in circularity in the centerless rim 110 may be due to imperfections in circularity in the tire 160. For example, imperfections in circularity of the tire 160 may cause the tire 160 to pull, shift, or otherwise deform the centerless rim 110 such that imperfections in circularity in the centerless rim 110 may be altered due to the tire 160. The tire 160 may be any tire, such as a solid rubber tire, a tubeless tire, a tire with a tube, a metal tire, a semi-pneumatic tire, an airless tire, etc. In some embodiments, the tire 160 and the centerless rim 110 may be a single unitary component.

In some embodiments, the centerless rim 110 may be configured to operate as a heat sink to dissipate heat from the operation of the wheel assembly 110. For example, the centerless rim 110 may be constructed of a thermally conductive material (e.g., aluminum (anodized or non-anodized), steel, stainless steel, etc.) to facilitate the transfer of heat from other components of the centerless wheel 100 to the centerless rim 110. For example, driving of the ring gear 120 via the drive gear 130 may generate heat. Such heat may transfer across the bolts 142a and 142b and/or the bushings 140a and 140b. The centerless rim 110 may dissipate the heat throughout the entire centerless rim 110. As another example, slowing and/or stopping the wheel assembly 100 using the brake rotor 150 may generate heat that may be drawn into and dissipated by the centerless rim 110. In some embodiments, the centerless rim 110 may include one or more channels or open spaces to facilitate heat dispersion. For example, such channels may increase the surface area of the centerless rim 110 through which heat may radiate away and out of the centerless rim 110. In some embodiments, by using the centerless rim 110 as a heat sink, temperature fluctuations for the tire 160 may be reduced and/or minimized such that the tire 160 may have a decreased probability of over-heating, expanding, exploding, or otherwise failing. In some embodiments, the coupling members may be treated in certain ways to prevent heat transfer between and among components. For example, the bolts 142 and/or the bushings 140 may be cross-drilled, have ceramic coatings, and/or include anodizing to prevent heat transfer from one component to the other through the coupling members.

In some embodiments, the wheel assembly 100 may include one or more components such as a motor 170, roller guides (e.g., roller guides 180, 182, 184, and 186), and/or brake calipers 158 that may be coupled to one or more exoskeleton plates 190 (e.g., the exoskeleton plates 190a and 190b). The exoskeleton plates 190a and 190b may remain stationary relative to the rotation of the centerless rim 110 and the ring gear 120.

In some embodiments, the brake rotor 150 may be coupled to the centerless rim 110 such that as the centerless rim 110 rotates, the brake rotor 150 also rotates. In these and other embodiments, the brake caliper 158 may be coupled to one or more of the exoskeleton plates 190. For example, as the brake rotor 150 is coupled to the centerless rim 110, as the wheel assembly 100 rolls along the ground the brake rotor 150 rotates at the same rate of rotation as the wheel assembly 100. Additionally, as the brake caliper 158 is coupled to the exoskeleton plates 190 the brake caliper 158 may remain fixed relative to the rotation of the brake rotor 150. By utilizing the exoskeleton plates 190 as a mounting point for the brake caliper 158, weight and space savings may be realized in the wheel assembly 100 by not needing additional components to mount or otherwise suspend the brake caliper 158 proximate and in a fixed manner relative to the brake rotor 150.

The motor 170 may include any source of motive power. For example, the motor 170 may include an electric motor such as a direct current (DC) motor, an alternating current (AC) motor, a brush motor, a brushless motor, a shunt wound motor, a separately excited motor, a series wound motor, a compound wound motor, a permanent magnet motor, a servomotor, an induction motor, a synchronous motor, a linear induction motor, a synchronous linear motor, etc. As another example, the motor 170 may include a fuel consuming engine, such as a four stroke engine, a diesel engine, a two stroke engine, a Wankel engine, an Atkinson engine, a gnome rotary engine, etc. In some embodiments, the motor 170 may include a small, high-speed, high-efficiency DC electric motor that may rotate at speeds greater than six thousand rotations per minute (RPM). In these and other embodiments, the use of such a small motor may be available because of the gearing ratio from the drive gear 130 to the ring gear 120. As an additional example, the engine or electric motor 170 may include a human-powered motive device, such as bicycle pedals, arm cranks, ratcheting levers, etc.

In some embodiments, the centerless rim 110 coupled with the ring gear 120 may function as both an output gear and a driven wheel. For example, a gearing ratio may be the ratio of the speed of the input gear to the speed of the output gear, which may be based on the number of teeth in each gear. In some embodiments, the drive gear 130 may have a small diameter and small number of teeth compared to a diameter and number of teeth of the ring gear 120, allowing a high gear ratio. The high gear ratio may offer a mechanical advantage over conventional wheels and/or conventional power transmission models and may improve efficiency, reduce weight, and/or reduce cost. In some embodiments, such a high gear ratio may include a ratio of between approximately five to one and approximately one hundred and twenty-five to one. In these and other embodiments, the gear ratio may be based on the intended use of the wheel assembly. Additionally or alternatively, the gear ratio may be based on a size of the wheel, which may be limited in size based on the application. For example, a vehicle may be limited in wheel size to the expected height of the vehicle, etc.

A gear ratio between the drive gear 130 and the ring gear 120 may be larger than is possible within a single stage of reduction in the case of a conventional wheel in some embodiments, which is often around three to one. For example, the ratio may include between approximately five to one and approximately one hundred and twenty-five to one. One reason for this large gearing ratio advantage is because the ring gear 120 as the output gear may be approximately the same size as the tire 160 (e.g., as illustrated in FIGS. 1A and 1B) with the input gear as the drive gear 130 is much smaller. This gearing advantage of the centerless wheel assembly 100 may facilitate additional economies of weight and space saving via adaption to a more dimensionally compact motor 170 (e.g., a brushless electric motor), which may otherwise, due to its small size, provide insufficient torque for a conventional wheel. The gearing advantage of the centerless wheel assembly 100 may also decrease one or more of the following: the amount of energy necessary for a vehicle coupled with the centerless wheel assembly 100 to overcome inertia, resistive losses, and the operating temperature of the electric motor 170, such that efficiency of the vehicle may be improved.

The roller guides 180, 182, 184, and/or 186 may include any device or component shaped and/or configured to roll along the centerless rim 110 as the centerless rim 110 rotates. For example the roller guides 180, 182, 184, and/or 186 may be suspended between the exoskeleton plates 190a and 190b via a bridging shaft that may operate as an axle for the roller guides 180, 182, 184, and/or 186. In some embodiments, the bridging shafts may be coupled with the exoskeleton plates 190a and 190b. In some embodiments, the exoskeleton plates 190a and 190b may be spaced apart, and the bridging shafts may form a bridge across a gap between the exoskeleton plates 190a and 190b. For example, any of the roller guides 180, 182, 184, and/or 186 may be disposed within the gap between the exoskeleton plates 190a and 190b. In some embodiments, the exoskeleton plates 190a and 190b may correspond to right-hand and left-hand exoskeleton plates.

In some embodiments, the roller guides 180, 182, 184, and/or 186 may include bearings to facilitate or otherwise make easier or more efficient the rotation of the roller guides about bridging shafts. In some embodiments, the bearings may be rotatably disposed within the roller guides 180, 182, 184, and/or 186.

In some embodiments, the roller guides 180, 182, 184, and/or 186 may be made of any material that is able to roll along the centerless rim 110 due to static friction. For example, the material may be selected to provide wear resistance and sufficient friction to drive or otherwise roll along the centerless rim 110. For example, the roller guides 180, 182, 184, and/or 186 may be made of a polymer, such as polyurethane, poly vinyl chloride (PVC), acetal (homopolymer), acetal (copolymer), nylon 66, nylon 66 (with 30% glass), phenolic (glass filled), polyetherimide, polyetheresulphone, polyimide, polyphenylenene sulfide, polysulfone, polytetrafluoroethylene (PTFE) (e.g., Teflon®), polyethylene (including ultra-high molecular weight (UHMW)), carbon fiber, aluminum, titanium, polyoxymethylene (e.g., Delrin®), etc.

Figure 3A:
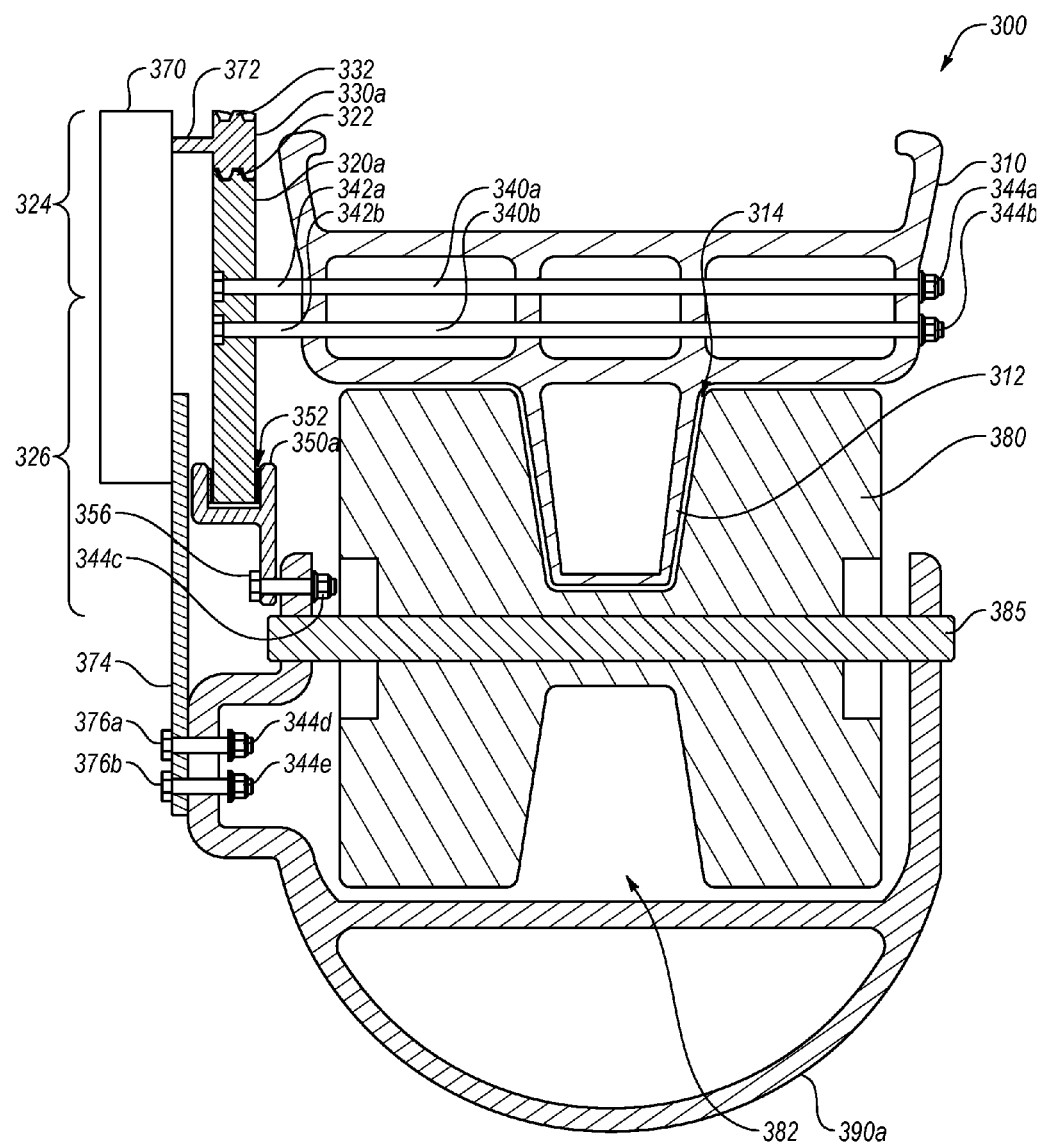
FIG. 3A illustrates a cross-sectional view of a portion of another example centerless wheel assembly.

In some embodiments, the roller guides 180, 182, 184, and/or 186 may be configured to include a shape or profile that matches a corresponding shape or profile of the centerless rim 110 (e.g., as illustrated in FIG. 3A). For example, the centerless rim 110 may be completely void of material in the middle of the centerless rim 110 and the roller guides 180, 182, 184, and/or 186 may be disposed within the void of material. In some embodiments, the roller guides 180, 182, 184, and/or 186 may contact the centerless rim 110. In some embodiments, the roller guides 180, 182, 184, and/or 186 be configured to act upon and guide the centerless rim 110 as the centerless rim 110 is rotated.

In some embodiments, one or more of the roller guides 180, 182, 184, and/or 186 may be configured to maintain the spatial relationship between the centerless rim 110 and the exoskeleton plates 190*a* and 190*b*. For example, one or more of the roller guides 180, 182, 184, and/or 186 may be disposed upon a spring loaded lever arm such that as the position of the centerless rim 110 is changed relative to the exoskeleton plates 190*a* and 190*b*, the roller guide on the lever arm may engage the centerless rim 110 so that the rim 110 maintains the spatial relationship with the exoskeleton plates 190*a* and 190*b*. The roller guides 180, 182, 184, and/or 186 may be similar or analogous to one or more of the roller guides described in U.S. application Ser. No. 15/146,729, hereby incorporated by reference in its entirety.

Figure 3B:
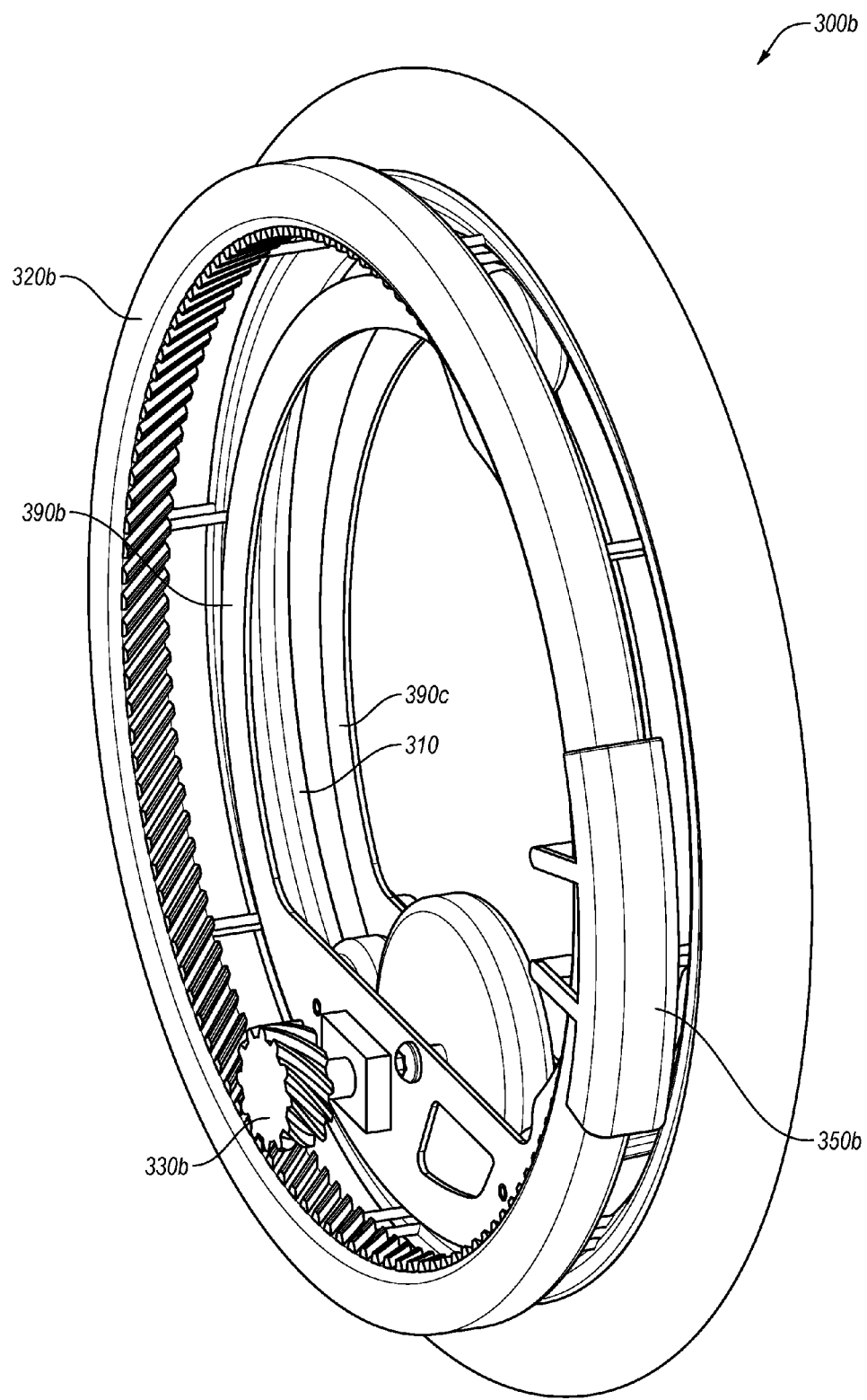
FIG. 3B illustrates a perspective view of an additional example centerless wheel assembly.

In some embodiments, the exoskeleton plates 190*a* and 190*b* may have a generally circular configuration, and may include a void in material through a central region of the exoskeleton plates 190*a* and 190*b*. Additionally or alternatively, the exoskeleton plates may be a solid sheet of material (including square or rectangular sheets of material), tubular, or any other shape or form such that the roller guides are supported proximate the centerless rim 110. In some embodiments, the exoskeleton plates 190*a* and 190*b* may have a lip about an outer circumference or outer edge. In some embodiments, the centerless rim 110 may be retained between the exoskeleton plates 190*a* and 190*b* as the centerless rim 110 is rotated. In some embodiments, an exoskeleton plate may span the centerless rim 110 and function as both the exoskeleton plates 190*a* and 190*b* (an example of such an embodiment is illustrated in FIG. 3A and FIG. 3B). In these and other embodiments, the exoskeleton plates 190*a* and 190*b* may be constructed of a single piece of material that supports both ends of a bridging shaft.

In some embodiments, the exoskeleton plates 190*a* and/or 190*b* may additionally include cladding that may provide a covering over any moving parts to increase aerodynamics, for example by reducing turbulence, drag, air resistance, wind resistance, etc. For example, a smooth form factor cladding may overlay the exoskeleton plates 190*a* and 190*b* to enclose any moving parts (e.g., the roller guides 180, 182, 184, and/or 186). In some embodiments, the cladding may also include a void in material about the middle of the centerless wheel assembly 100. In these and other embodiments, the cladding and the exoskeleton plates 190*a* and 190*b* may be combined into a single piece of material to further improve aerodynamics and/or reduce weight, turbulence, drag, air resistance, wind resistance, etc. For example, in some embodiments (e.g., as illustrated in FIG. 3A), the exoskeleton plates 190*a* and 190*b* and/or the cladding may form a generally U-shaped profile. As another example, the exoskeleton plates 190*a* and 190*b* and/or the cladding may form an asymmetrical shape (e.g., with the leading and trailing edges aerodynamically optimized). In some embodiments, at speeds above twenty miles per hour, there may be an increased aerodynamic performance due to the lack of spokes and the U-shaped profile. The exoskeleton plates 190*a* and/or 190*b* may be similar or analogous to one or more of the exoskeleton plates described in U.S. application Ser. No. 15/146,729, hereby incorporated by reference in its entirety.

For convenience in describing the location, orientation, and/or position of various components, the centerless rim 110 may be described as defining a plane ("rim plane"). The rim plane may be the plane defined by points along the inner diameter of the rail 112 and/or the plane through the middle of each of the roller guides 180, 182, 184, and/or 186. Additionally or alternatively, the centerless rim 110 may include a center point in the middle of the centerless rim. The center point of the centerless rim 110 may lie on the rim plane defined by the centerless rim. The ring gear 120 may also define a plane ("gear plan"). The gear plane may be the plane defined by the points along the inner diameter of the ring gear 120. The ring gear 120 may also include a center point in the middle of the ring gear 120 that may lie on the gear plane defined by the ring gear 120. In some embodiments, the gear plane and the rim plane may be generally parallel. Additionally or alternatively, the center point of the ring gear 120 and the center point of the centerless rim 110 may define a line that is generally perpendicular to the rim plane and/or the gear plane. Using such a description, for example, the teeth 122 may be in the plane of the ring gear 120 and may point in towards the center point of the ring gear 120 (even for helical teeth, which may cut through the plane of the ring gear 120 at an angle, the teeth 122 may point generally towards the center point of the ring gear 120).

In some embodiments, the centerless wheel assembly 100 may be configured to have an open center or a void of material in the center of the wheel assembly 100, which may provide a storage region with spatial capacity for storage of any of a variety of items such as a mechanized drive, cargo, fuel tanks, motors, engines, battery packs, luggage, an electricity storage system, etc. Additionally or alternatively, the void of material in the center of the wheel assembly 100 may be left open for space savings, weight savings, etc.

Figure 8A:
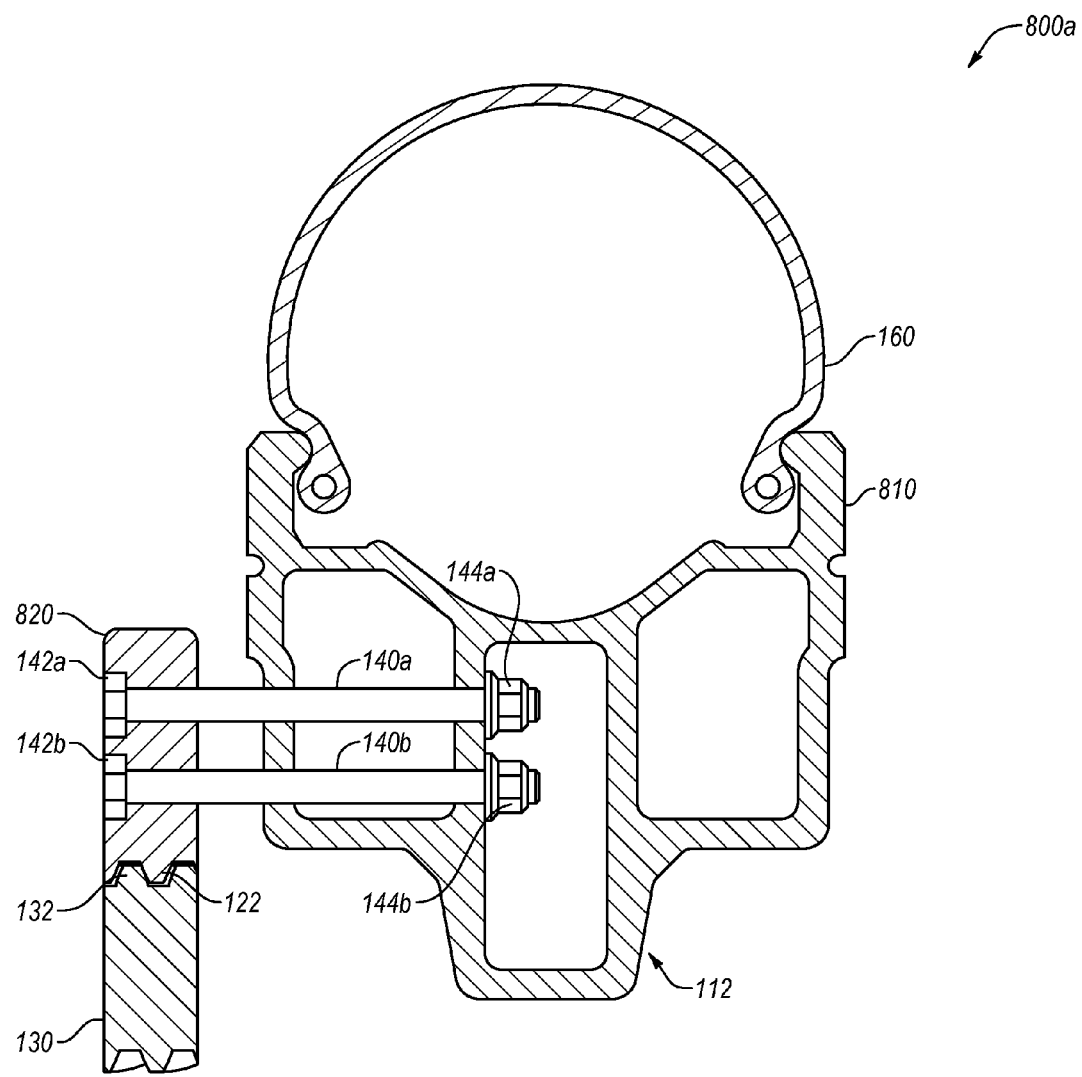
FIG. 8A illustrates a cross-sectional view of a portion of an example centerless wheel assembly.
Figure 8B:
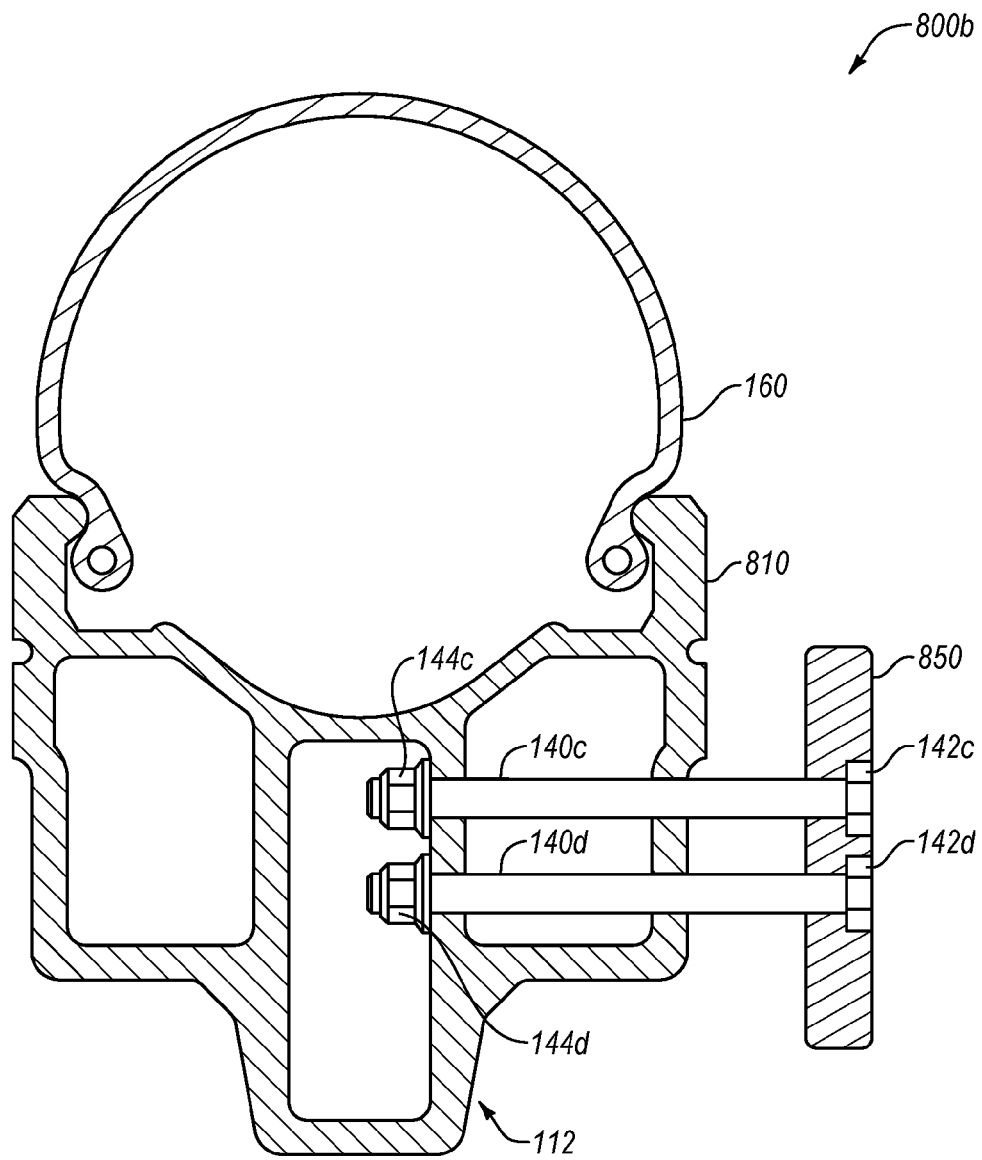
FIG. 8B illustrates a cross-sectional view of a portion of another example centerless wheel assembly.

Modifications, additions, or omissions may be made to FIGS. 1A, 1B, and 2 without departing from the scope of the present disclosure. For example, the centerless wheel assembly 100 may include more or fewer elements than those illustrated and described in the present disclosure. For example, in some embodiments, the wheel assembly 100 may not include the brake rotor 150 and the brake caliper 158 (e.g., as illustrated in FIG. 8A), while in other embodiments, the wheel assembly 100 may not include the ring gear 120 (e.g., as illustrated in FIG. 8B). As an additional example, the wheel assembly 100 may include any number of roller guides disposed at various locations around the centerless rim 110. As another example, the exoskeleton plates 190a and/or 190b may take any shape or form that provides the functionality described in the present disclosure. For example, a square or rectangular plate without a void in the middle may be utilized in the centerless wheel assembly 100. As another example, the brake rotor 150 and the ring gear 120 may be on opposite sides of the wheel assembly 100. Additionally or alternatively, the brake rotor 150 and the ring gear 120 may be combined in a single device (e.g., as illustrated in FIGS. 3A and 3B). Additionally, the placement of the motor 170 may vary depending on some implementations.

FIG. 3A illustrates a cross-sectional view of a portion of another example centerless wheel assembly 300a, in accordance with one or more embodiments of the present disclosure. The centerless wheel assembly 300a may include a centerless rim 310 with a rail 312 that may be similar or comparable to the centerless rim 110 with the rail 112 of FIGS. 1 and 2; a ring gear 320a with teeth 322 that may be similar or comparable to the ring gear 120 with teeth 122 of FIGS. 1 and 2; a drive gear 330a with teeth 332 that may be similar or comparable to the drive gear 130 with teeth 132 of FIGS. 1 and 2; bushings 340a and 340b, bolts 342a and 342b, and nuts 344a and 344b that may be similar or comparable to the bushings 140a and 140b, bolts 142a and 142b, and nuts 144a and 144b of FIGS. 1 and 2; a motor 370 that may be similar or comparable to the motor 170 of FIGS. 1 and 2; a roller guide 380 that may be similar or comparable to the roller guide 180 of FIGS. 1 and 2; and an exoskeleton plate 390a that may be comparable or similar to the exoskeleton plates 190a and 190b of FIG. 1.

Figure 4A:
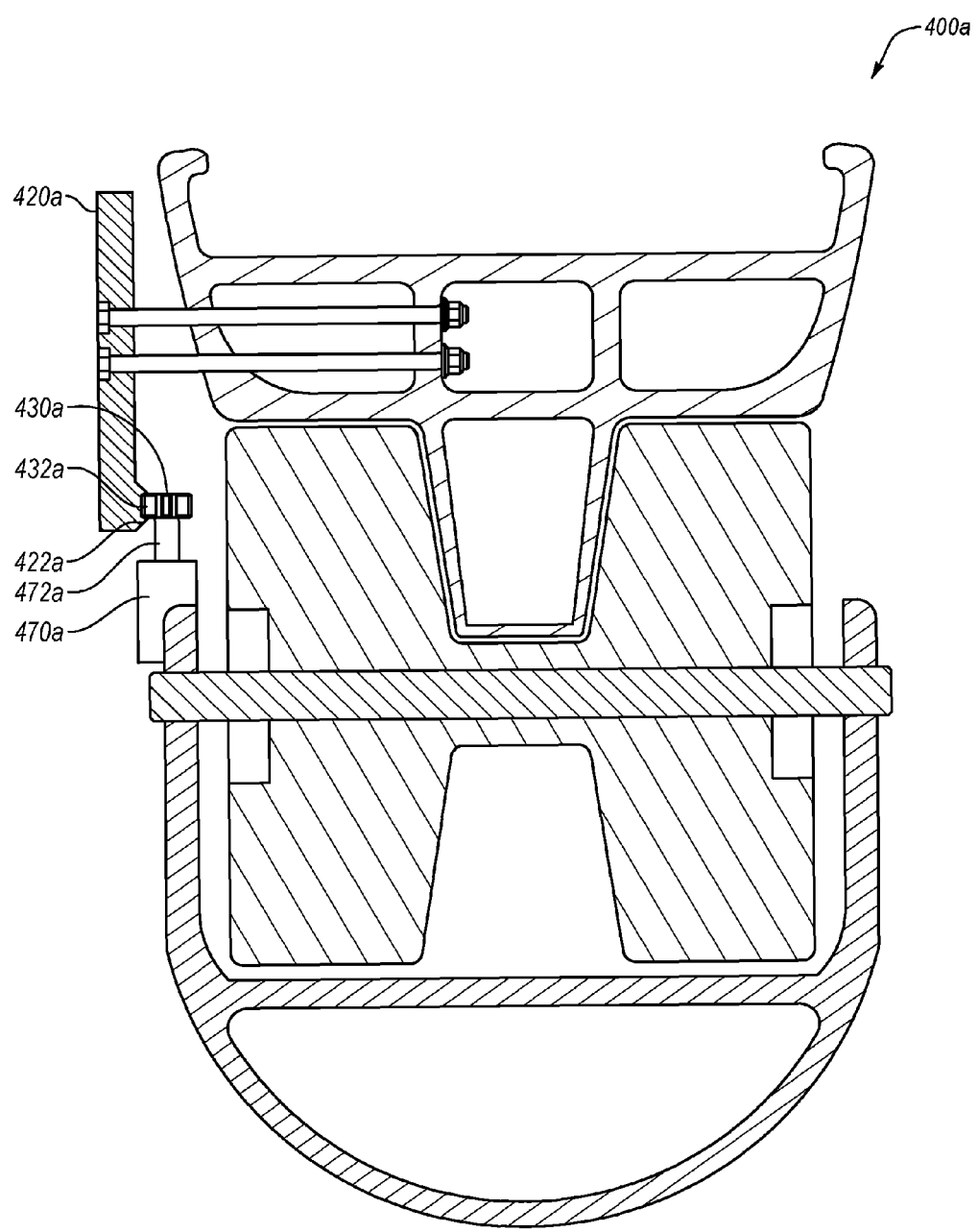
FIG. 4A illustrates a cross-sectional view of a portion of another example centerless wheel assembly.
Figure 4B:
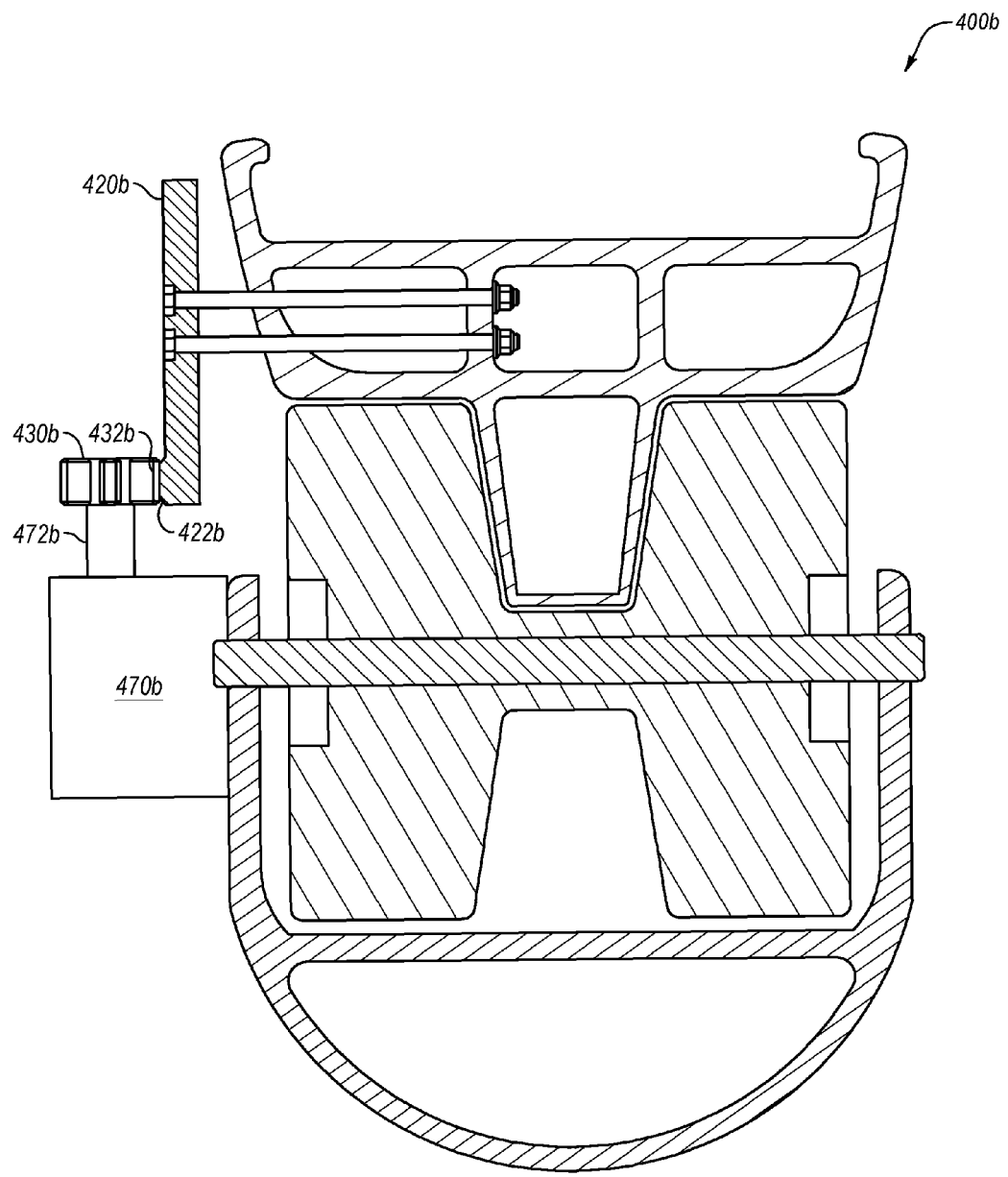
FIG. 4B illustrates a cross-sectional view of a portion of an additional example centerless wheel assembly.
Figure 4C:
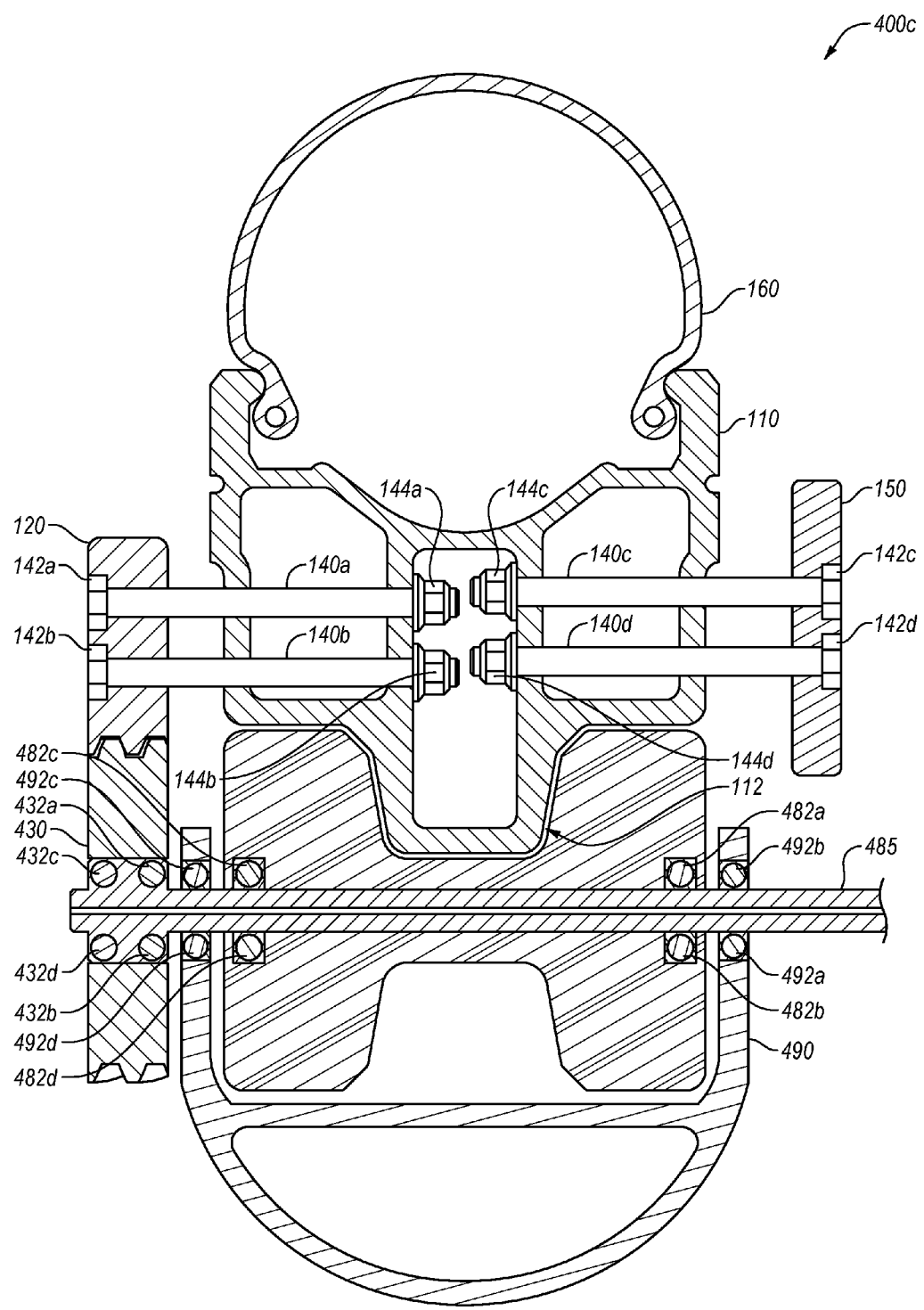
FIG. 4C illustrates a cross-sectional view of a portion of another example centerless wheel assembly.
Figure 4D:
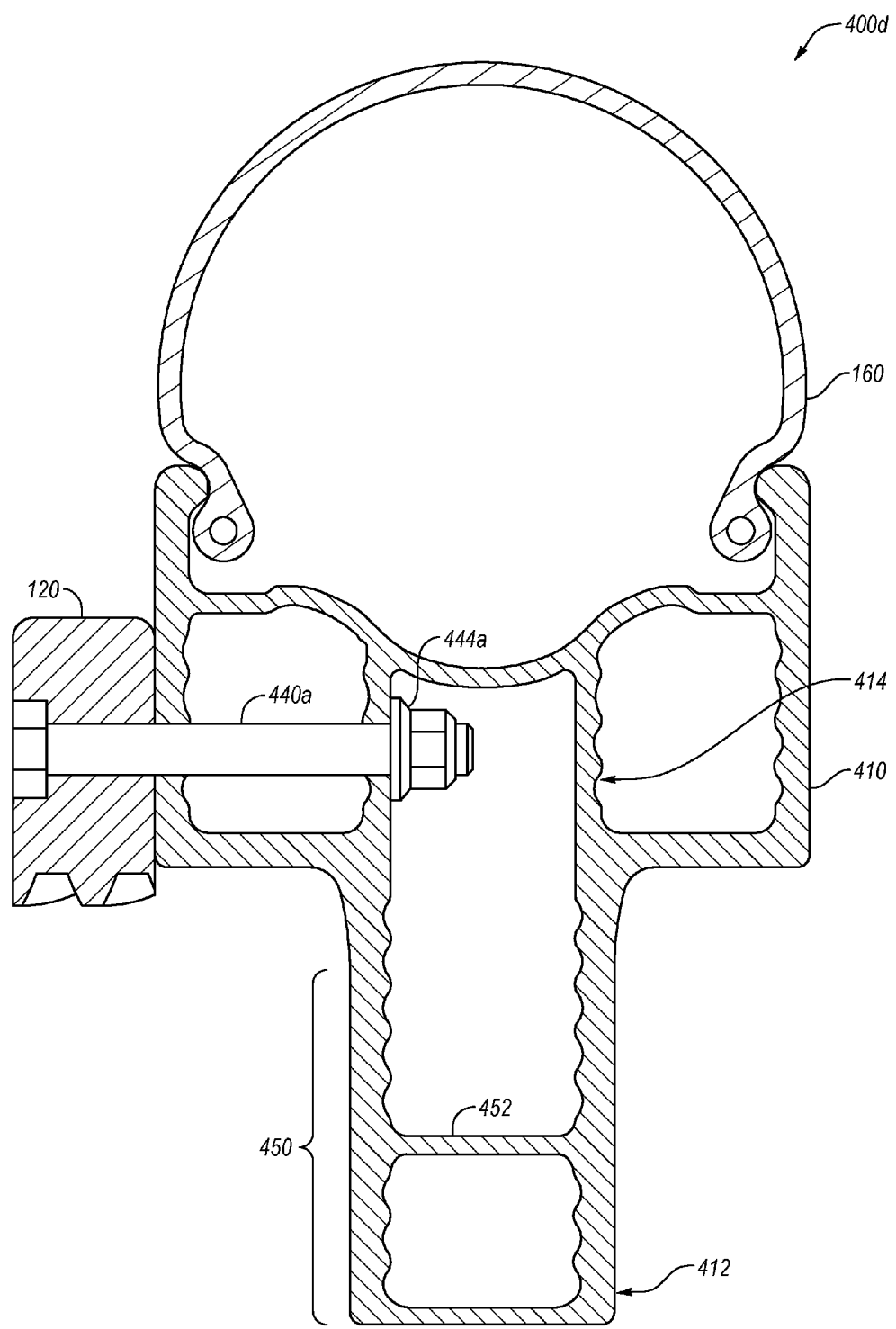
FIG. 4D illustrates a cross-sectional view of a portion of an additional example centerless wheel assembly.
Figure 4E:
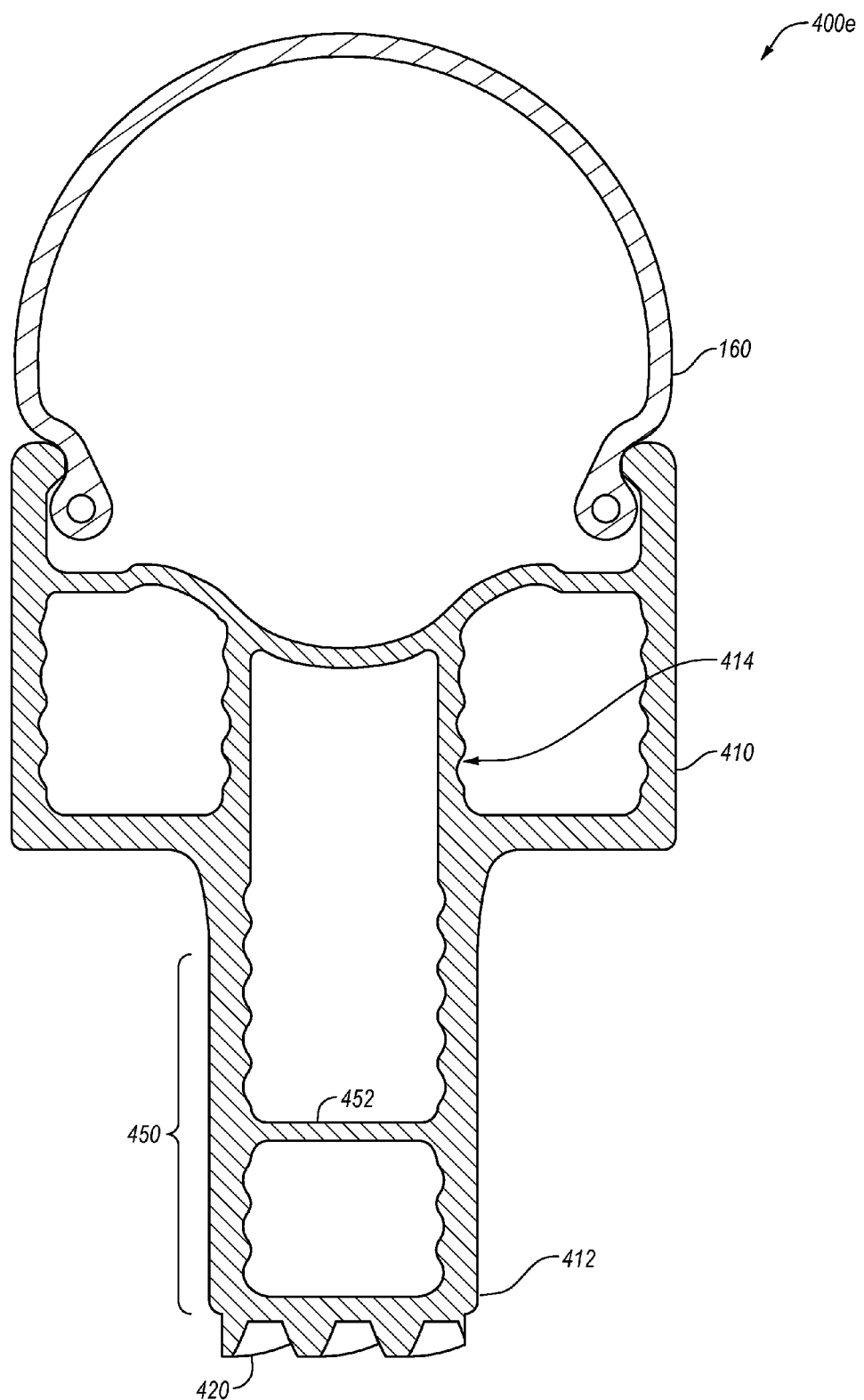
FIG. 4E illustrates a cross-sectional view of a portion of another example centerless wheel assembly.

In some embodiments, the centerless rim 310 may have any of a variety of profiles (another example of which may be illustrated in FIGS. 4D and 4E). The roller guide 380 may have a profile that matches or aligns with the profile of the centerless rim 310. For example, the centerless rim 310 may include the rail 312. The roller guide 380 may have a corresponding gap 382 that may be the same or a similar size as the rail 312. In some embodiments, a gap 314 may exist between the roller guide 380 and the centerless rail 310. For example, during normal operation and/or normal rotation of the centerless rim 310, the roller guide 380 may not contact the rail 312 but may still roll along the centerless rim 310. In these and other embodiments, when subjected to abnormal forces, such as a pothole, sharp cornering, a jump, etc., the rail 312 may contact the roller guide 380 to maintain a spatial relationship between the centerless rim 310 and the exoskeleton plate 390a. In some embodiments, the roller guide 380 may not contact the centerless rim 310 unless subject to abnormal forces.

In some embodiments, the roller guide 380 may be supported by a bridging shaft 385. The bridging shaft 385 may span between a first portion and a second portion of the exoskeleton plate 390a. The bridging shaft 385 may function as an axle for the roller guide 380. In some embodiments, the bridging shaft 385 may be made of a light weight material such as aluminum.

In some embodiments, the teeth 322 of the ring gear 320a may be oriented differently than illustrated in FIGS. 1A, 1B, and 2. For example, the teeth 322 may be oriented along the outer diameter of the ring gear 320a rather than along the inner diameter of the ring gear 120 of FIGS. 1A, 1B, and 2. Stated another way, the teeth 322 may point generally away from the center point of the ring gear 320a while being in the plane defined by the ring gear 320a. In some embodiments, the teeth 322 may be part of a first portion 324 of the ring gear 320a that may be further from the center point. The ring gear 320a may include a second portion 326 closer to the center point of the ring gear 320a.

In some embodiments, the second portion 326 of the ring gear 320a may operate as a brake rotor. For example, the second portion 326 of the ring gear 320a may be disposed proximate a brake caliper 350. The brake caliper 350 may include one or more brake pads 352 such that as the brake caliper 350 is compressed, the brake pads 352 may contact the second portion 326 of the ring gear 320a to slow down the ring gear and correspondingly, slow down the centerless rim 310. The brake caliper 350 may remain in a fixed position relative to the rotation of the ring gear 320a. Thus, as the brake caliper 350 is compressed, the friction between the brake pad 352 and the second portion 326 of the ring gear 320a may reduce the speed of the ring gear 320a.

In some embodiments, the brake caliper 350 may be coupled to the exoskeleton plate 390a via a bolt 356 and a nut 344c. In these and other embodiments, the brake caliper 350a may be coupled to any portion of the exoskeleton plate 390a. The exoskeleton plate 390a may maintain a spatial relationship with the centerless rim 310 and the ring gear 320a as the centerless rim 310 and the ring gear 320a are rotated. By coupling the brake caliper 350a to the exoskeleton plate 390a, the brake caliper may be positioned such that the ring gear 320a may rotate freely proximate the brake caliper 350a when the brake caliper 350a is not activated, but may interact with the brake caliper 350a when the brake caliper 350a is activated. While illustrated as being coupled using the bolt 356, the brake caliper 350a may be coupled to the exoskeleton plate 390a via any other coupling mechanism (e.g., screws, rivets, brazing, adhesives, etc.). In some embodiments, the brake caliper 350a may be disposed at approximately a three o'clock (as illustrated in FIG. 3B) or a nine o'clock position. In some embodiments, the motor 370 may be mounted at approximately a six o'clock position.

In some embodiments, the bolts 342a and/or 342b may extend through multiple channels or gaps of the centerless rim 310. For example, to increase stability due to the weight and additional forces caused by the ring gear 322 acting as both the ring gear and the brake rotor, the bolts 342a and 342b may extend through an entire width of the centerless rim 310. In some embodiments, the bushings 340a and 340b may pass through the entire centerless rim 310. In these and other embodiments, the additional length of the bolts 342a and 342b and/or the additional length of the bushings 340a and 340b may facilitate the operation of the centerless rim 310 as a heat sink. In these and other embodiments, the increased heat caused by the ring gear 320a acting as both a ring gear and a brake rotor may be dissipated using the centerless rim 310.

In some embodiments, the motor 370 may be coupled to the exoskeleton plate 390a via the bolts 376a and 376b and nuts 344d and 344e. Any other coupling mechanism may also be used. The motor 370 may have an output shaft 372 to which the drive gear 330a may be coupled. In some embodiments, because the teeth 322 are disposed on the outer diameter of the ring gear 322, the motor 370 may be disposed on a bypass arm 374 that may extend the output shaft 372 of the motor 370 proximate the teeth 322. Additionally or alternatively, the motor 370 may not use the bypass arm 374 and the output shaft 372 may include a mechanical linkage that may displace the force generated at the output shaft 372 such that the drive gear 330a receives the force generated by the motor 370 at the drive gear 320a to drive the ring gear 320a.

In some embodiments, the exoskeleton plate 390a may include one or more features to facilitate coupling of various components to the exoskeleton plate 390a. For example, as illustrated in FIG. 3A, the exoskeleton plate may include a protrusion to which the bypass arm 374 may be coupled such that the motor 370 and/or the bypass arm 374 may not interfere with the brake caliper 350a and/or the ring gear 320a. Any such features may be included to facilitate spatial relationships of the various components that may be coupled to the exoskeleton plate 390a.

In some embodiments, the location of the teeth 322 and the brake caliper 350a may be reversed. For example, the teeth 322 of the ring gear 320a may be on the inner diameter of the ring gear 322 (e.g., closer to the center point of the ring gear 320a) and the brake caliper 350a may be proximate the outer diameter of the ring gear 320a (e.g., further from the center point of the ring gear 320a).

In some embodiments, the exoskeleton plate 390a may include cladding or a profile that may cover any moving parts of the centerless wheel assembly 300a. For example, the exoskeleton plate 390a may include cladding that may cover or enclose the drive gear 330a and the teeth 332.

FIG. 3B illustrates a perspective view of an additional example centerless wheel assembly 300b. The wheel assembly 300b may be similar to the wheel assembly 300a of FIG. 3A, except a variation in the placement of the brake caliper 350b, the drive gear 330b, and the teeth of the ring gear 320b. Additionally, the exoskeleton plates 390b and 390c are illustrated as two distinct plates rather than a single plate 390a as illustrated in FIG. 3A. However, any of these modifications may be combined or rearranged in any manner and are still be within the scope of the present disclosure.

As illustrated in FIG. 3B, the ring gear 320b may function as both the ring gear and as a brake rotor. The brake caliper 350b may be disposed proximate the ring gear such that by contracting the brake caliper 350b the brake caliper 350b may contact the ring gear 320b and friction between the brake caliper 350b may slow down the ring gear 320b and thus the centerless rim 310. In some embodiments, the brake caliper 350b may be supported by posts, rods, or other support structure coupled to the exoskeleton plate 390b. For example, a post or support rod may pass through the plane defined by the ring gear 320b within the circumference of the ring gear 320b and support the brake caliper 350b. By supporting the brake caliper 350b from within the circumference of the ring gear 320b, the brake caliper 350b may avoid interference with any bolts, bushings, or other attachment members coupling the ring gear 320b to the centerless rim 310.

Modifications, additions, or omissions may be made to FIGS. 3A and/or 3B without departing from the scope of the present disclosure. For example, the centerless wheel assemblies 300a and/or 300b may include more or fewer elements than those illustrated and described in the present disclosure. For example, the wheel assembly 300a may include any number of components coupled to the exoskeleton plate 390a. As another example, the wheel assembly 300a may include an additional or alternative braking mechanism to slow down the centerless rim 310 and/or the ring gear 320a.

FIG. 4A illustrates a cross-sectional view of a portion of an additional example centerless wheel assembly 400a, in accordance with one or more embodiments of the present disclosure. FIG. 4B illustrates a cross-sectional view of a portion of an additional example centerless wheel assembly 400b, and FIG. 4C illustrates a cross-sectional view of a portion of another example centerless wheel assembly 400c. FIGS. 4D and 4E illustrate additional examples of centerless wheel assemblies 400d and 400e, respectively, with different rim profiles. FIGS. 4A, 4B, and 4C illustrate alternative arrangements of the placement of the teeth of the drive gear and/or other components associated with driving the drive gear in relation to other components of the wheel assemblies 400a, 400b, and 400c. The wheel assemblies 400a, 40b, and 400c may be similar or comparable to the wheel assembly 100 of FIGS. 1 and 2.

As illustrated in FIG. 4A, the ring gear 420a may include teeth 422a on an inside face of the ring gear 420a. A motor 470a may be disposed proximate the teeth 422a such that an output shaft 472a of the motor 470a is oriented proximate the teeth 422a. Additionally or alternatively, a drive gear 430a with teeth 432a may be disposed between the roller guide and the ring gear 420a. The teeth 432a may interface with the teeth 422a such that the drive gear 430a drives the ring gear 420a. In such an embodiment, the ring gear 420a may be disposed a distance away from the centerless rim sufficient for the motor 470a and/or the drive gear 430a to be disposed within the space between the roller guide and the ring gear 420a. In such an arrangement, the drive gear 430a and the teeth 422a may be covered by the ring gear 420a to provide an aerodynamic advantage.

As illustrated in FIG. 4B, a ring gear 420b may include teeth 422b on an outside face of the ring gear 420b. A motor 470b may be disposed proximate the teeth 422b such that an output shaft 472b of the motor 470b is oriented proximate the teeth 422b. Such an arrangement may allow for a larger motor 470b and/or a larger drive gear 430b with teeth 432b. The teeth 432b may interface with the teeth 422b such that the drive gear 430b drives the ring gear 420b.

As illustrated in FIG. 4C, a drive shaft 485 of the centerless wheel assembly may pass through an exoskeleton plate 490, a roller guide 480, and a drive gear 430c. The exoskeleton plate 490 and roller guide 480 may be similar or analogous to the exoskeleton plate 390a and the roller guide 380 of FIG. 3A.

The drive shaft 485 may be coupled to any type of drive mechanism (not illustrated) on the side of the wheel assembly 400c opposite the drive gear 430c. For example, the drive shaft 485 may be coupled directly to a motor, to a drivetrain or other gearing to a motor, to a half-shaft of an automobile, etc.

The exoskeleton plate 490 may include one or more bearings 492 (e.g. the bearings 492a, 492b, 492c, and 492d) that may allow the drive shaft 485 to rotate freely relative to the exoskeleton plate 490. For example, the exoskeleton plate 490 may remain stationary with respect to the drive shaft 485 while the drive shaft 485 rotates due to a motive force of the drive mechanism (not illustrated).

In some embodiments, the roller guide 480 may include one or more bearings 482 (e.g. the bearings 482a, 482b, 482c, and 482d) that may allow the drive shaft 485 and/or the roller guide 480 to rotate freely. For example, the bearings 482 may facilitate the drive shaft 485 rotating freely within the roller guide 480 without driving the roller guide 480 while also driving the drive gear 430c. Simultaneously, the bearings 482 may also allow the drive shaft 485 to act as an axle for the roller guide 480 such that the roller guide 480 may roll along the centerless rim 10. By using the drive shaft 485 as both a drive shaft and as an axle, the wheel assembly 400c may have further weight reduction.

The drive gear 430c may include one or more bearings 433 (e.g. 433a, 433b, 433c, and 433d). The bearings 433 may be one-way bearings and/or the drive shaft may be keyed to the drive gear 430c. In some embodiments, the drive gear 430c may rotate with the drive shaft 485 as a unitary body, such that rotation of the drive shaft 485 in either direction also causes a corresponding rotation of the drive gear 430c. In some embodiments the drive gear 430c and the drive shaft 485 may be coupled such that the drive gear 430c may only rotate in one direction, such that rotation of the drive shaft 485 in one direction causes a corresponding rotation of the drive gear 430c but rotation of the drive shaft 485 in the other direction does not cause a rotation of the drive gear 430c and the drive shaft 485 may rotate freely within the drive gear 430c when rotated in that other direction.

In some embodiments, the drive shaft 485 may pass through the exoskeleton plate 490 at a location different than the location of one of the roller guides 480. In these and other embodiments, the drive shaft may not function as an axle for the roller guide 480. In such embodiments, the exoskeleton plate 490 may include the bearings 492 to facilitate the free rotation of the drive shaft 485 when spanning the exoskeleton plate 490.

FIG. 4D illustrates a cross sectional view of another example centerless wheel assembly 400d. The wheel assembly 400d may be similar or comparable to the centerless wheel assembly 100 of FIGS. 1A, 1B, and 2. The wheel assembly 400d may include a centerless rim 410 with a rail 412 projecting along an inner circumference of the centerless rim 410 towards a center point of the centerless rim 410. The wheel assembly 400d may include a drive gear 120, a bushing 440a and bolt 444a. The drive gear 120 may be similar or comparable to the drive gear 120 of FIGS. 1A, 1B, and 2. The bushings 440a may be similar or comparable to the bushing 140a of FIGS. 1A, 1B, and 2. The nuts 444a may be similar or comparable to the nuts 144a of FIG. 1.

The centerless rim 410 may include a profile with an elongated rail 412 when compared with the rail 112. The rail 412 may be shaped and/or configured to be used as a brake rotor of the wheel assembly 410. For example, a portion 450 of the rail 412 may be relatively flat with a relatively uniform width across the portion 450 such that a brake caliper may interfere with a large surface area of the portion 450 when the brake caliper (not illustrated) is activated to slow down the centerless rim 410.

Figure 7:
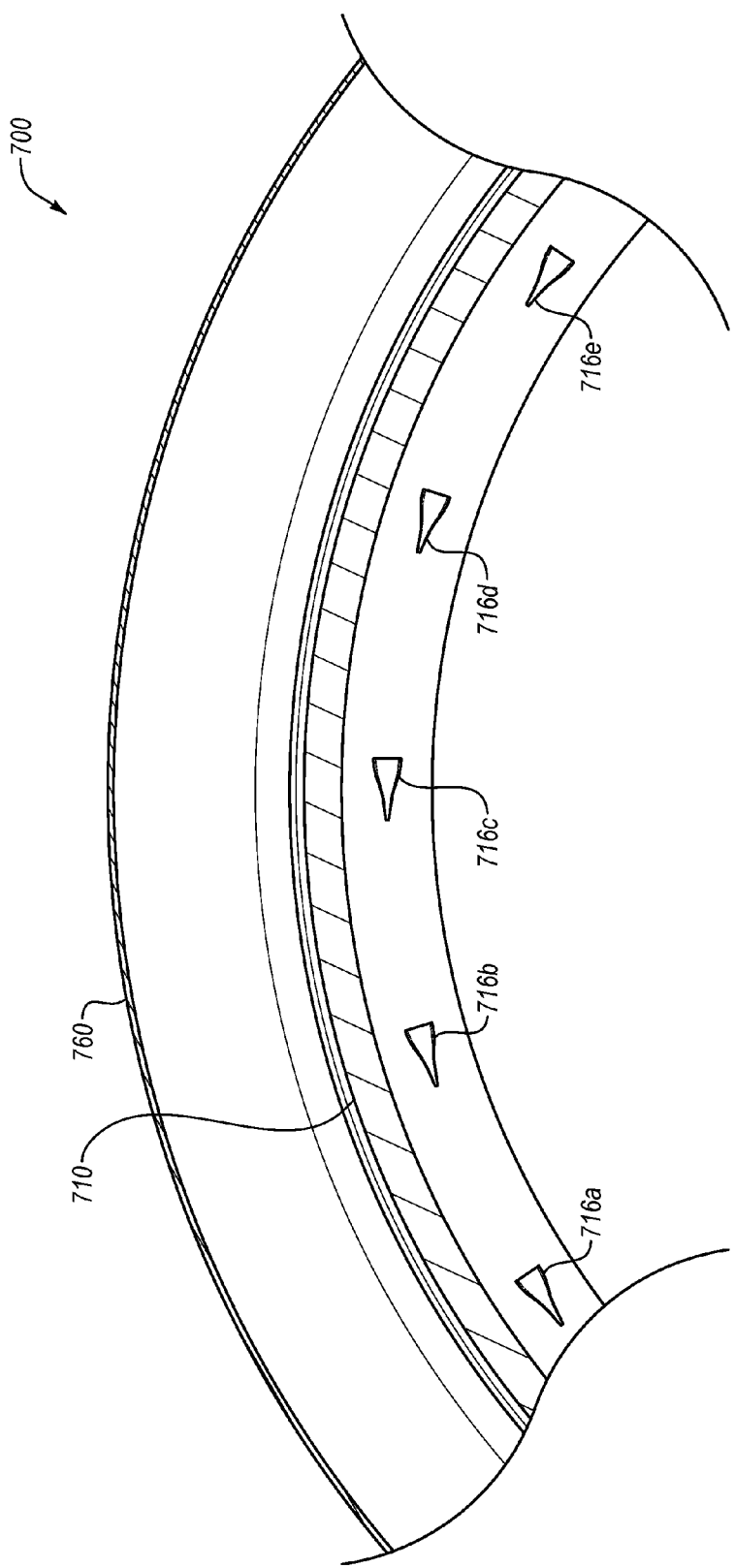
FIG. 7 illustrates a side view of a portion of an additional example centerless wheel assembly.

The profile of the centerless rim 410 may include a series of pockets or channels to facilitate heat dissipation from the centerless rim 410, in some embodiments. For example, the centerless rim 410 may draw heat from the drive gear interfacing with the ring gear, and may draw heat from the friction between the brake caliper and the portion 450 acting as a brake rotor. In some embodiments, the centerless rim 410 may include vents or ducts to facilitate air exchange for a more rapid dissipation of heat via exchange of heat with the air. In these and other embodiments, the vents may take any shape or form to facilitate air exchange. For example, the vents may include a shape or profile of a NACA (National Advisory Committee for Aeronautics) duct (e.g., as illustrated in FIG. 7).

In some embodiments, the profile of the centerless rim 410 may include one or more corrugations 414. The corrugations 414 may be present along one or more of the internal or external surfaces of the centerless rim 410. As illustrated in FIG. 4D, in some embodiments, the corrugations 414 may be on one or more of the internal surfaces of the centerless rim 410 to increase structural integrity and/or material strength. Additionally or alternatively, the corrugations 414 may provide an increased surface area to facilitate additional heat exchange with the air. The profile may include one or more fins 452 passing between each side of the portion 450 used for braking. The fins 452 may facilitate additional heat transfer and dissipation from the centerless rim 410.

In some embodiments, one or more areas of the portion 450 used for braking may be coated with a material to facilitate braking, wear resistance, and/or heat dissipation. For example, one or more areas of the portion 450 may be coated with ceramic, carbon, etc. Additionally or alternatively, any of the other braking or contacting surfaces may be treated and/or coated with such a material. For example, any brake rotors and/or brake calipers, any gears or gear teeth, any roller guides, any centerless rims, etc.

FIG. 4E illustrates a cross sectional view of another example centerless wheel assembly 400e. The wheel assembly 400e may be similar or comparable to the wheel assembly 400d. However, rather than using the ring gear 120, teeth 420 may be disposed along the inner circumference of the apex of the rail 412. In these and other embodiments, the rail 412 may function as the brake rotor and as the ring gear. In these and other embodiments, roller guides may be larger and/or have a larger gap to accommodate the size of the rail 412. For example, the rail 412 may have an increased length used to accommodate the portion 450 used as a brake rotor and to accommodate the teeth 420. In some embodiments, by using the rail 412 as the brake rotor and the ring gear, additional weight savings and cost savings may be obtained.

In some embodiments, a tire tube may be disposed within the tire 160. In these and other embodiments, the air valve may protrude into the rail 412. In some embodiments, the air valve may protrude outside of the rail 412 and an associated roller guide may include a gap or space for the air valve. Additionally or alternatively, there may be a gap in the rail 412 to facilitate access to the air valve while keeping the air valve below the inner circumference of the rail 412. The air valve and/or the tube may take any size or dimension suited to match the size of the wheel assembly (e.g., the wheel assemblies 400d, 400e, etc.). For example, the air valve may include a 30 mm valve stem, a 35 mm valve stem, etc. In some embodiments, the tube and/or the air valve size may correspond to a standard manufacturing size of tire tubes.

Modifications, additions, or omissions may be made to FIGS. 4A, 4B, 4C, 4D, and 4E without departing from the scope of the present disclosure. For example, the centerless wheel assemblies 400a, 400b, 400c, 400d, and/or 400e may include more or fewer elements than those illustrated and described in the present disclosure. For example, the wheel assemblies 400a, 400b, 400c, 400d, and/or 400e may include any braking mechanism to slow down and/or stop the ring gear 420a and/or 420b and/or the centerless rim. As another example, the ring gears 420a and/or 420b may additionally operate as brake rotors. As an additional example, the drive shaft 485 may span the exoskeleton plate 490 or may span the exoskeleton plate 490 and the roller guide 480.

Figure 5A:
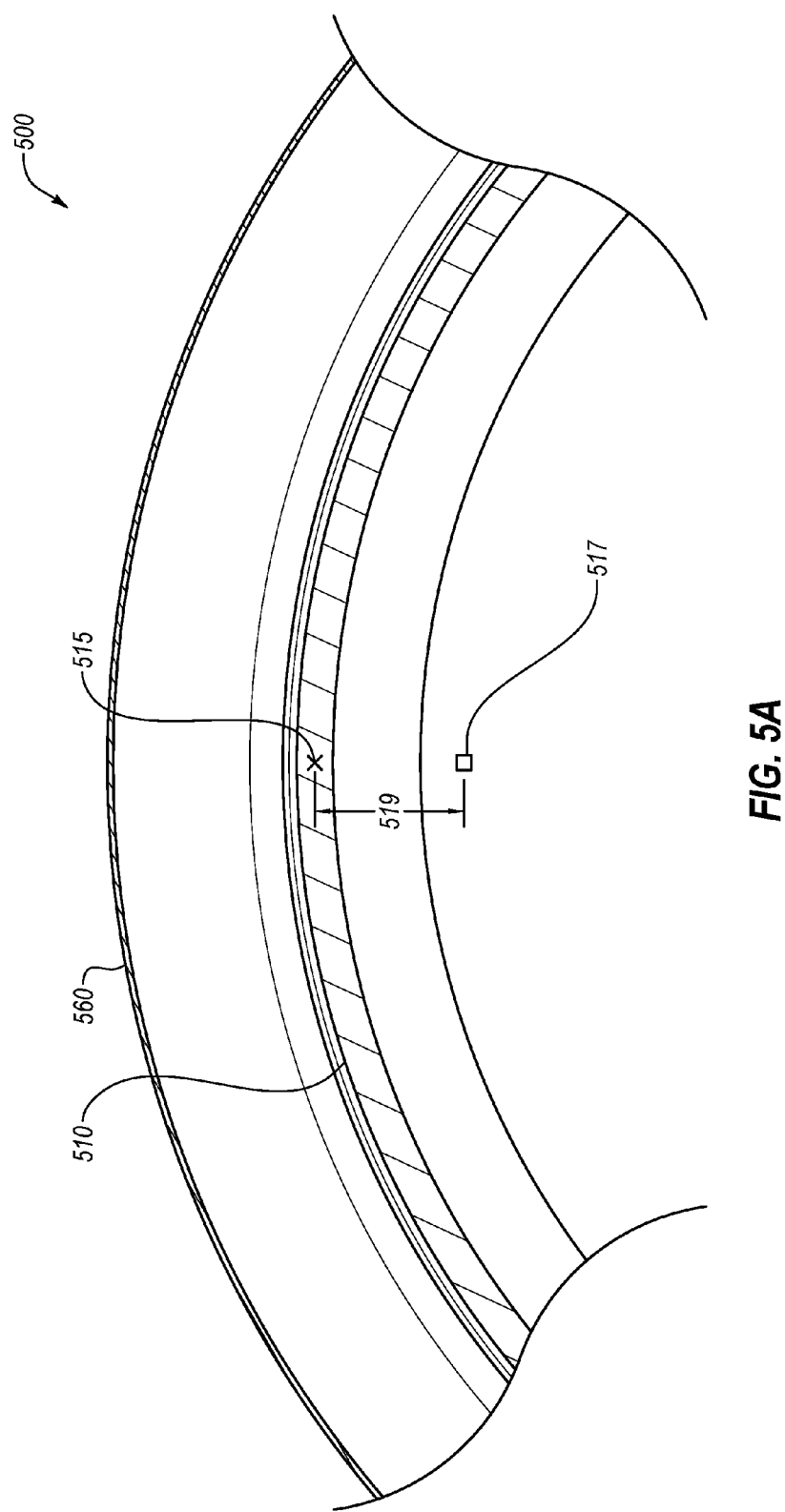
FIG. 5A illustrates a side view of a portion of an example centerless wheel assembly.
Figure 5B:
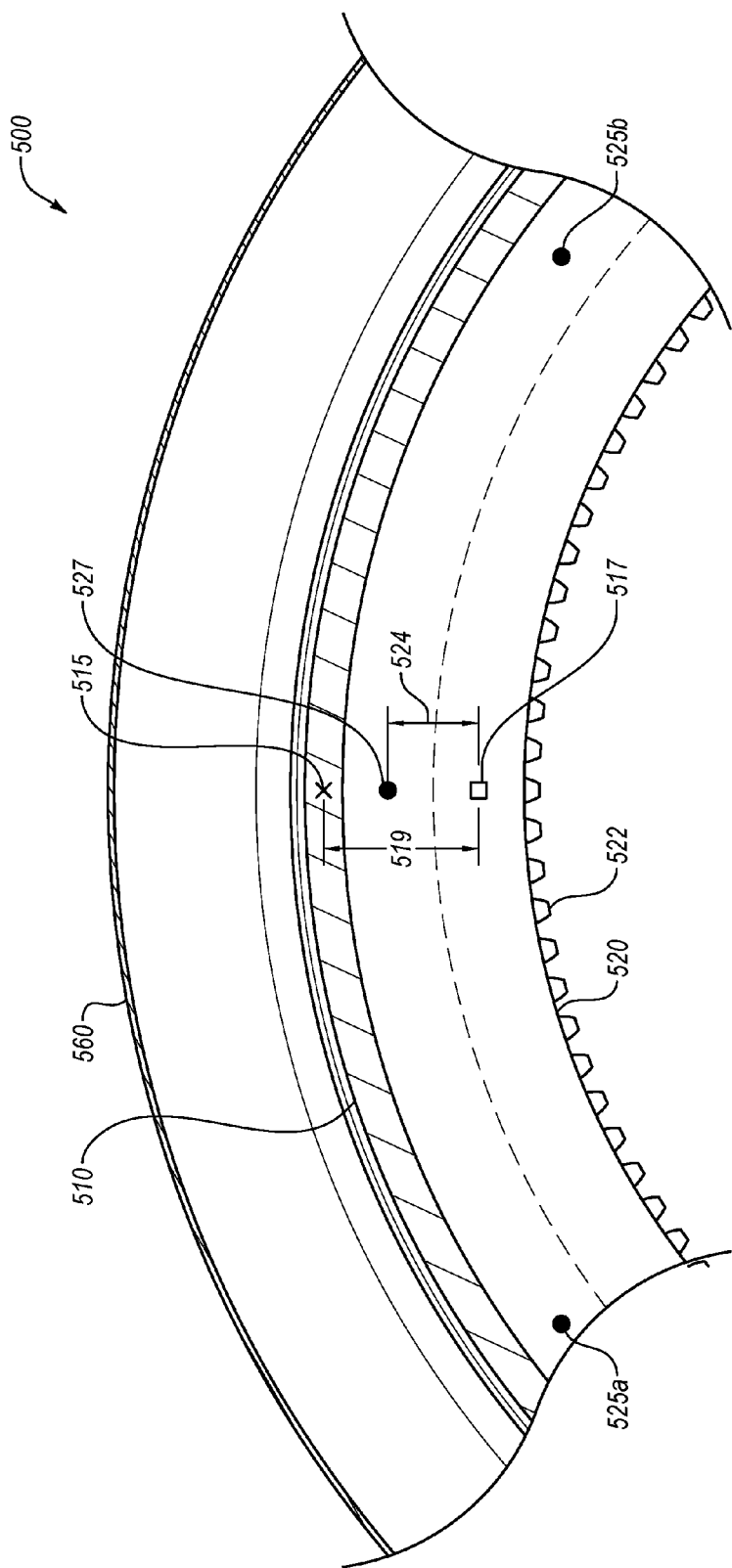
FIG. 5B illustrates a side view of a portion of the example centerless wheel assembly of FIG. 5A.
Figure 5C:
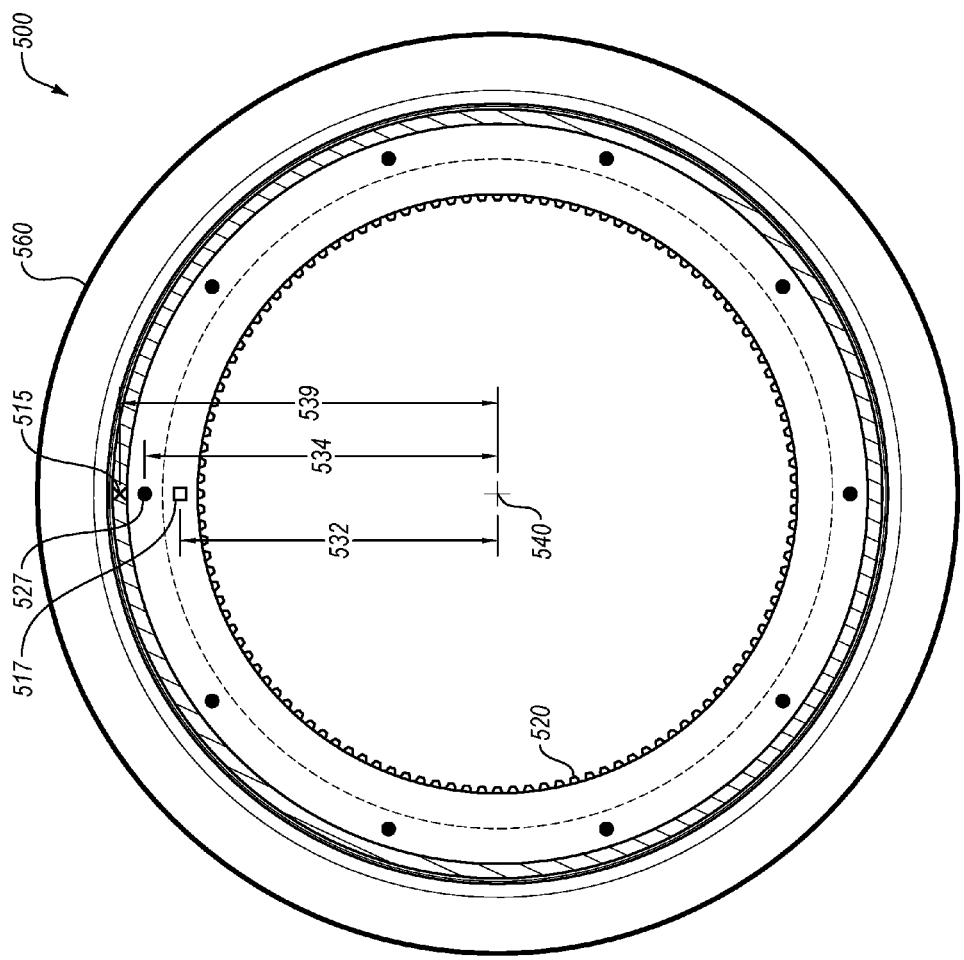
FIG. 5C illustrates a side view of the example centerless wheel assembly of FIGS. 5A and 5B.

FIGS. 5A-5C illustrate a process by which a ring gear 520 may be coupled to a centerless rim 510 such that the wheel assembly 500 is operable despite imperfections in circularity in the centerless rim 510 and/or an associated tire 560, in accordance with one or more embodiments of the present disclosure. FIG. 5A illustrates a side view of a portion of the centerless wheel assembly 500 before the ring gear 520 is coupled to the centerless rim 510. FIG. 5B illustrates a side view of the portion of the centerless wheel assembly 500 after the ring gear 520 is coupled to the centerless wheel assembly 500. FIG. 5C illustrates a side view of the entire centerless wheel assembly 500 after the ring gear 520 is coupled to the centerless wheel assembly 500. In particular, by attaching the ring gear 520 offset by a certain amount to account for the imperfections in circularity, the ring gear wheel assembly 500 may operate similarly to a wheel without imperfections in circularity.

As illustrated in FIG. 5A, a point 515 may be identified with an imperfection in circularity. Such a point of imperfection in circularity may be illustrated by an "X." In these and other embodiments, the point 515 may be offset a distance 519 from an expected point 517 of where the point 515 would be if the centerless rim 510 and/or the tire 560 were perfectly round. The expected point 517 may be illustrated with an open box. For example, there may be a typical location on the centerless rim 510 where holes may be drilled to couple the centerless rim 510 to a ring gear, such as a certain distance away from the tire 560 towards a center point of the centerless rim 510. In some embodiments, the point 515 may be the same certain distance away from the tire 560 as in the typical location for a perfectly round wheel assembly.

In some embodiments, the point 515 may be the point of greatest imperfection in circularity. For example, the centerless rim 510 and/or the tire 560 may be coupled to a rotating device that may facilitate identification of the greatest point of imperfection about the circumference of the centerless rim 510 and/or the tire 560.

As illustrated in FIG. 5B, the ring gear 520 may be coupled to the centerless rim 510 based on the imperfections of circularity. For example, a hole 527 may be drilled along the line from the center point of the centerless rim 510 and the point 515. The hole 527 may be offset from the expected point 517 by a distance 524 that may be approximately the same or shorter than the distance 519. For example, the hole 527 may be located approximately half the distance between the point 515 and the expected point 517. In some embodiments, the distance 524 may be selected based on the distance 519 and the location of the point 515 with respect to an edge of the centerless rim 510. For example, the distance 524 may be selected such that there is adequate material of the centerless rim 510 to support bolts or other connecting members that may be used to couple the ring gear 520 to the centerless rim 510.

As described above with reference to FIG. 5A, after the hole 527 has been created, other holes (e.g., holes 525a and 525b) may be drilled as part of a series of holes following a path of circularity. The series of holes besides the hole 527 may lie on the path of circularity or may approach the path of circularity. In these and other embodiments, if the hole 527 is at the point of greatest imperfection in circularity of the centerless rim 520 and/or the tire 560, the other holes in the series of holes (e.g., the holes 525a and 525b) may be more closely aligned with the path of circularity than the hole 527. In these and other embodiments, a hole may be drilled starting at the point 515, followed by a series of holes following a circular shape. For example, the series of holes may follow a shape of circularity more circular than that observed by the centerless rim 510 and/or the tire 560. As another example, a ring gear may be nearly perfectly circular, and the holes may follow the path of circularity of the ring gear. In some embodiments, the ring gear may have more specific tolerances of circularity in manufacturing than for the centerless rim 510 and/or the tire 560. In some embodiments, the series of holes may be created in a successive manner, starting at the point 515.

As illustrated in FIG. 5C, the expected point 517 may be offset from the center point 540 of the centerless rim 510 a first distance 532, the hole 527 may be offset from the center point 540 a second distance 534, and the point 515 may be offset from the center point 540 a third distance 539. For example, the second distance 534 may correspond to the distance 524 in addition to the first distance 532. As another example, the third distance 539 may correspond to the distance 519 in addition to the first distance 532.

While FIGS. 5A-5C are described with reference to the ring gear 520, the same principles are equally applicable to a brake rotor (not illustrated). For example, such a brake rotor may be more circular (e.g., have fewer imperfections in circularity) than the centerless rim 510. The same analysis of imperfection of the centerless rim 510 and the drilling of holes and attachment of the brake rotor may be followed.

Modifications, additions, or omissions may be made to FIGS. 5A-5C without departing from the scope of the present disclosure. For example, the centerless wheel assembly 500 may include more or fewer elements than those illustrated and described in the present disclosure. For example, the wheel assembly 500 may include any of the components or arrangements consistent with the present disclosure. As another example, the distance 524 may be based on a variety of factors and may be at a variety of locations other than as illustrated in FIGS. 5A-5C.

Figure 6:
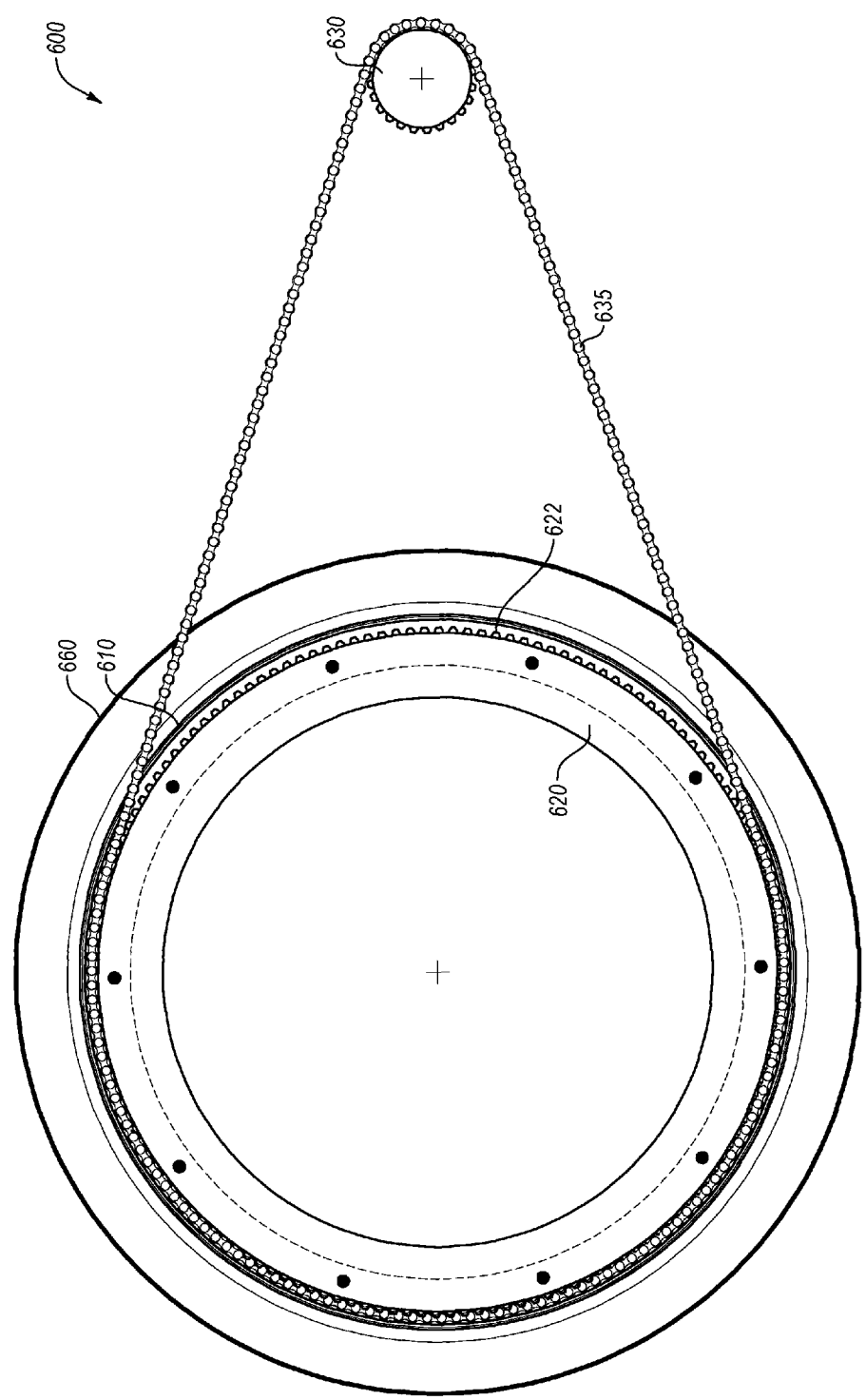
FIG. 6 illustrates a side view of another example centerless wheel assembly.

FIG. 6 illustrates a side view of another example centerless wheel assembly 600, in accordance with one or more embodiments of the present disclosure. The wheel assembly 600 may be comparable or similar to the wheel assembly 100 of FIG. 1. The wheel assembly 600 may include a centerless rim 610 that may be comparable or similar to the centerless rim 110 of FIG. 1, a ring gear 620 that may be comparable or similar to the ring gear 320a of FIG. 3A (e.g., with teeth 622 pointing away from a center point of the ring gear 320a), and a tire 660 that may be similar or comparable to the tire 160 of FIG. 1.

In some embodiments, the wheel assembly 600 may include a drive gear 630. The drive gear 630 may be similar or comparable to the drive gear 330a of FIG. 3A. However, the drive gear 630 may be located some distance away from the ring gear 620 and/or the centerless rim 610. The drive gear 630 may interface with a chain 635 such that the teeth of the drive gear 630 may rotate the chain 635 and the chain 635 may interface with the teeth 622 of the ring gear 620 such that rotation of the drive gear 30 may cause a corresponding rotation of the ring gear 622 due to rotation of the chain 635. The chain 635 may be implemented as a belt, drive train, or other feature to change the location of the rotational force of the drive gear 630 to the ring gear 620.

In some embodiments the drive gear 630 may be located closer to the tire 660 or further away from the tire 660 than illustrate in FIG. 6. In some embodiments, the location of the drive gear 630 may be based on the application in which the wheel assembly 600 is used. For example, for a bicycle, the drive gear 630 may be located proximate one or more pedals of the bicycle.

Modifications, additions, or omissions may be made to FIG. 6 without departing from the scope of the present disclosure. For example, the centerless wheel assembly 600 may include more or fewer elements than those illustrated and described in the present disclosure. For example, the wheel assembly 600 may include any of the components or arrangements consistent with the present disclosure. As another example, the wheel assembly 600 may include one or more exoskeleton plates and one or more roller guides (not illustrated).

FIG. 7 illustrates a side view of a portion of an additional example centerless wheel assembly 700, in accordance with one or more embodiments of the present disclosure. The wheel assembly 700 may be similar or analogous to the wheel assembly 100 of FIGS. 1A, 1B and 2. The wheel assembly 700 may include a centerless rim 710 and a tire 760. The centerless rim 710 may be similar or analogous to the centerless rim 110 of FIGS. 1A, 1B and 2, and may have a similar profile to the centerless rim illustrates in FIGS. 4D and 4E. The tire 760 may be similar or analogous to the tire 160 of FIGS. 1A, 1B, and 2.

In some embodiments, the centerless rim 710 may include one or more vents 716 (e.g., vents 716a-716e). In some embodiments, the vents 716 may be a hole going all the way through the material of the centerless rim 710. In some embodiments, the vents 716 may be an indentation such that one end of the vent 710 is open and the material curves back flush with the face of the centerless rim 710. In some embodiments, the vents 716 may be disposed at regular intervals around the entire circumference of the centerless rim 710, or the vents 716 may be disposed at various locations and depths around the centerless rim 710.

In some embodiments, the vents 716 may include a shape of a National Advisory Committee for Aeronautics (NACA) duct. In these and other embodiments, the vents 716 may be shaped to allow air to flow in through the vents 716 with minimal disturbances to the air flow. Such vents may facilitate an aerodynamic profile along the face of the centerless rim 710 while providing air to cool the centerless rim 710. In some embodiments, the vents 716 may be implemented in embodiments in which a rail of the centerless rim 710 is used as a brake rotor (e.g., as illustrated in FIGS. 4D and 4E).

Modifications, additions, or omissions may be made to FIG. 7 without departing from the scope of the present disclosure. For example, the centerless wheel assembly 700 may include more or fewer elements than those illustrated and described in the present disclosure. For example, the wheel assembly 700 may include any of the components or arrangements consistent with the present disclosure. As another example, the wheel assembly 700 may include any number of vents or ducts, with those vents or ducts taking any shape, profile, or orientation.

FIGS. 8A and 8B illustrate cross-sectional views of a portion of example centerless wheel assemblies. FIG. 8A illustrates a centerless wheel assembly 800a with a centerless ring gear 820 and without a brake rotor. FIG. 8B illustrates a centerless wheel assembly 800b with a brake rotor 850 and without a centerless ring gear. As illustrated in these figures, in some embodiments, a wheel assembly may exclude a brake rotor or may exclude a ring gear.

While illustrated as having the ring gear 820 (in FIG. 8A) and the brake rotor 850 (in FIG. 8B) on opposite sides of a wheel assembly, the ring gear 820 and/or the brake rotor 850 may be coupled to the wheel assembly on either side of the wheel assembly. For example, the ring gear 820 or the brake rotor 850 may be coupled to an outside face of the wheel assembly, e.g., a face on the outside of a vehicle employing the wheel assembly. Additionally or alternatively, the ring gear 820 or the brake rotor 850 may be coupled to an inside face of the wheel assembly, e.g., a face facing the inside of the vehicle.

In some embodiments that include multi-wheeled vehicles, such a vehicle may include some wheels that include a ring gear and exclude a brake rotor (e.g., FIG. 8A) and other wheels that include a brake rotor and exclude a ring gear (e.g., FIG. 8B).

Modifications, additions, or omissions may be made to FIGS. 8A and/or 8B without departing from the scope of the present disclosure. For example, the centerless wheel assemblies 800a and/or 800b may include more or fewer elements than those illustrated and described in the present disclosure. For example, the wheel assemblies 800a and/or 800b may include any of the components or arrangements consistent with the present disclosure.

Figure 9:
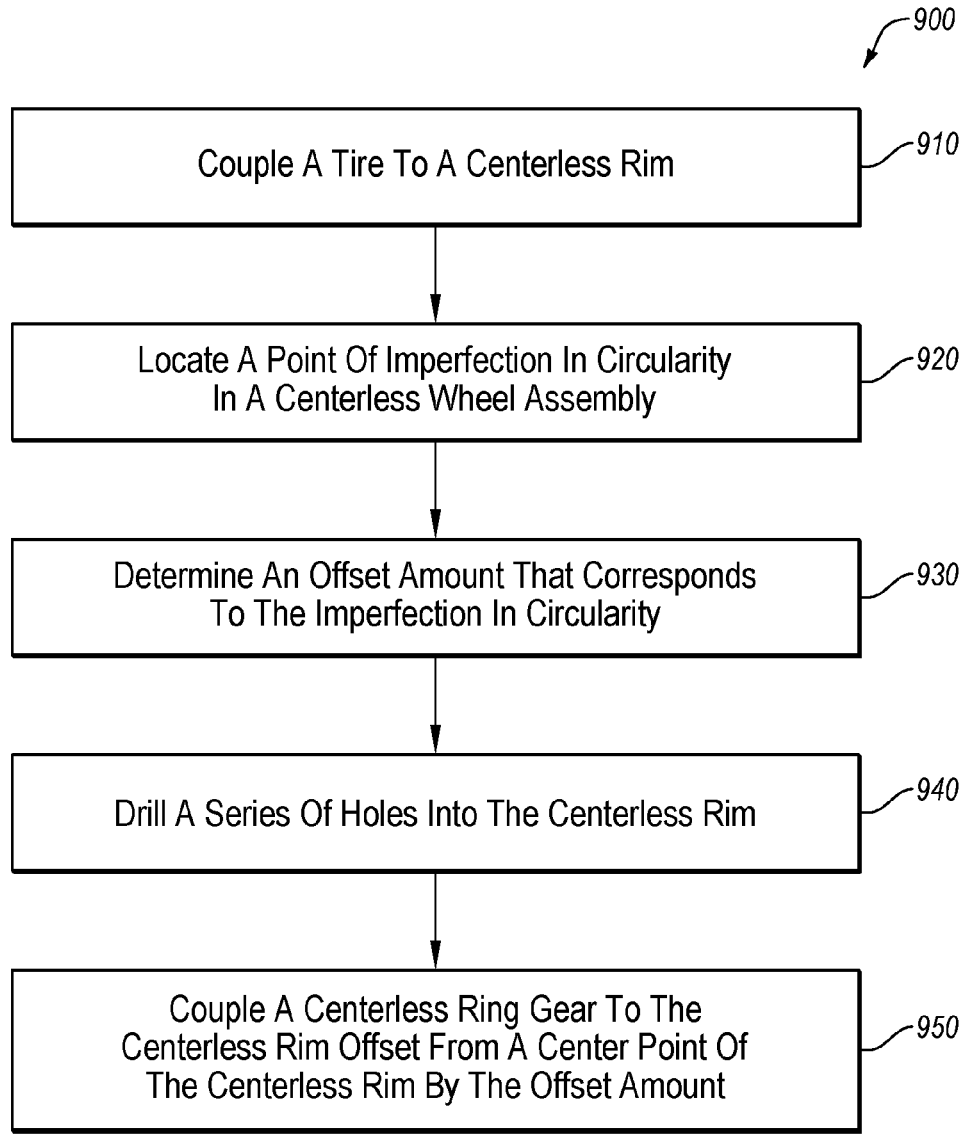
FIG. 9 illustrates a flow chart of an example method of manufacturing a centerless wheel assembly.

FIG. 9 illustrates a flow chart of an example method 900 of manufacturing a centerless wheel assembly, in accordance with one or more embodiments of the present disclosure. The method 900 may be performed by any suitable system, apparatus, or device. For example, the wheel assembly 500 may perform or be utilized in performing one or more of the operations associated with the method 900. Although illustrated with discrete blocks, the steps and operations associated with one or more of the blocks of the method 900 may be divided into additional blocks, combined into fewer blocks, or eliminated, depending on the desired implementation.

At block 910, a tire may be coupled to a centerless rim. For example, a centerless rim may be extruded or otherwise manufactured and a tire may be attached to the centerless rim. The centerless rim and the tire may be part of a centerless wheel assembly.

At block 920, a point of imperfection in circularity in the centerless wheel assembly may be located. For example, the centerless wheel assembly may be coupled to a device to rotate the centerless wheel assembly such that imperfections in circularity may be identified. Imperfections in circularity may be due to the centerless rim, the tire, etc. In some embodiments, the device that rotates the centerless wheel assembly may orient the centerless wheel assembly in a certain direction with respect to the located point of imperfection in circularity. For example, the centerless wheel assembly may be turned until the point of greatest imperfection in circularity is pointing vertically and may then be locked in place.

At block 930, an offset amount that corresponds to the imperfection in circularity may be determined. For example, a distance from the center point or a distance from the expected point of circularity may be used to determine the offset amount. In some embodiments the offset amount may be between the greatest point of imperfection in circularity and an expected point of circularity.

At block 940, a series of holes may be drilled into the centerless rim beginning at the point identified in block 920. The holes may follow a path of circularity of a ring gear or other path of circularity. In some embodiments, the holes may be drilled by the device that rotated the centerless wheel assembly at block 920, or the device may include guides or other assistance in locating the location to place the series of holes (e.g., laser pointers, markings, etc.)

At block 950, a ring gear may be coupled to the centerless rim offset from a center point of the centerless rim by the offset amount. For example, as illustrated in FIG. 5C, the ring gear may be bolted to the centerless rim using the holes drilled at block 940 such that the ring gear is offset from the center point of the centerless rim by the offset amount. By offsetting the ring gear from the centerless rim, imperfections in circularity may be accounted for such that as the centerless wheel assembly is rotated or otherwise operated, the circularity of the ring gear may continue to interface with and align with the centerless rim.

Modifications, additions, or omissions may be made to the method 900 without departing from the scope of the present disclosure. For example, the operations of the method 900 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments. For example, the blocks 910 and 940 may be omitted. As an additional example, the blocks 920 and 930 may be performed simultaneously by the same device.

While the method 900 of FIG. 9 is described with reference to a ring gear, the same principles are equally applicable to a brake rotor. For example, such a brake rotor may be more circular (e.g., have fewer imperfections in circularity) than a centerless rim to which the brake rotor may be coupled. The same analysis of imperfection of the centerless rim and the drilling of holes and attachment of the brake rotor may be followed.

Figure 10:
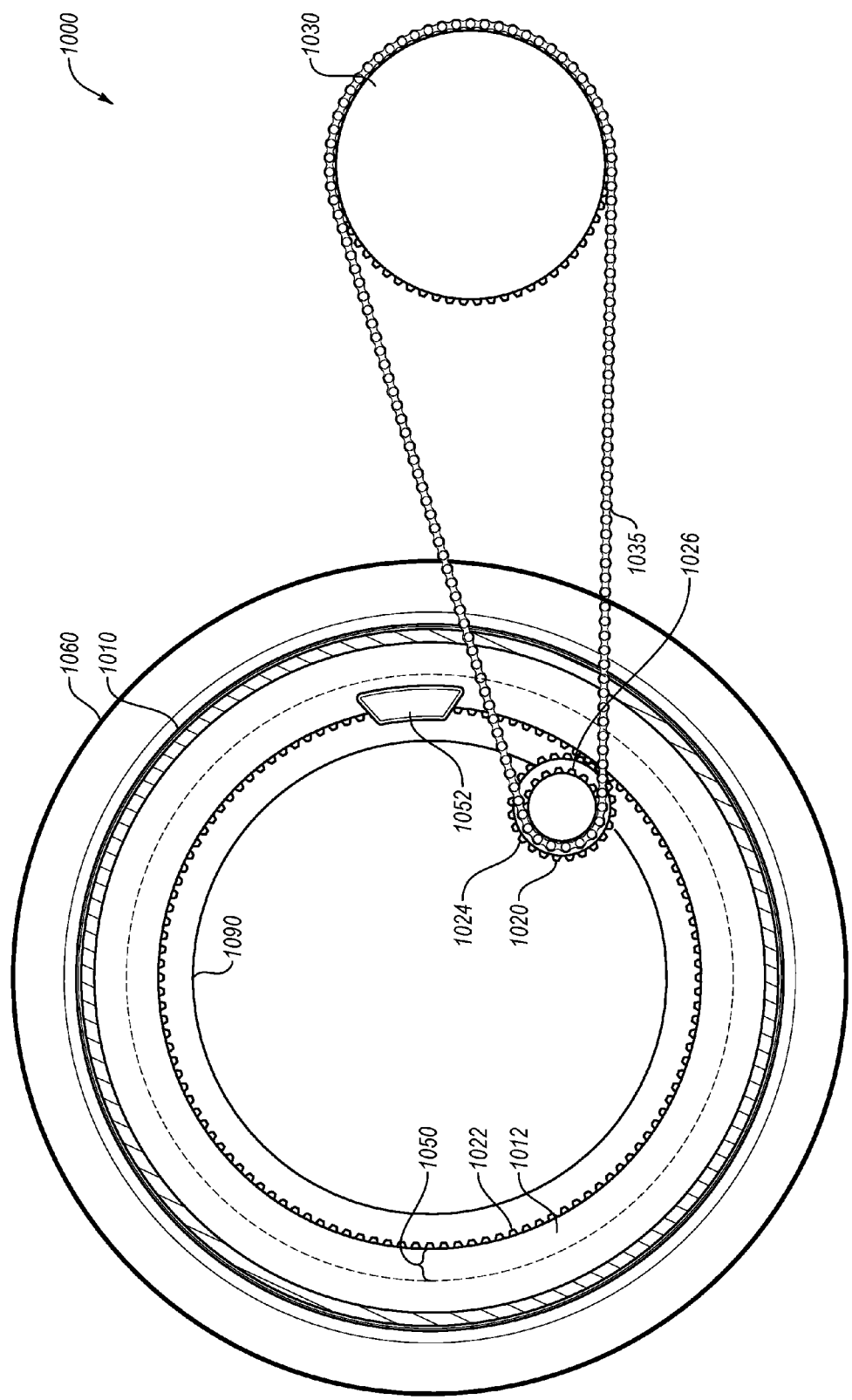
FIG. 10 illustrates a side view of an example centerless wheel assembly.

FIG. 10 illustrates a side view of an example centerless wheel assembly 1000, in accordance with one or more embodiments of the present disclosure. For example, the centerless wheel assembly 1000 may be a side view with one exoskeleton plate removed and one exoskeleton plate 1090 visible. The exoskeleton plate 1090 may be similar or comparable to the exoskeleton plates 190*a* and 190*b* of FIG. 1A. The centerless wheel assembly 1000 may include a centerless rim 1010 that may be similar or comparable to the centerless rim 410 of FIG. 4E, including a rail 1012 that may be similar or comparable to the rail 412 of FIG. 4E. Additionally, just as the rail 412 includes the portion 450 to function as a brake rotor and interface with a brake caliper, the rail 1012 may include a portion 1050 of the rail 1012 that acts as a brake rotor and interfaces with a brake caliper 1052. The brake caliper 1052 may be coupled to one or more of the exoskeleton plates (e.g., the exoskeleton plate 1090) such that the brake caliper 1052 remains stationary relative to the centerless rim 1010. The rail 1012 may additional include teeth 1022 that may be similar or comparable to the teeth 422 of the rail 412 of FIG. 4E. The centerless wheel assembly 1000 may include a tire 1060 that may be comparable or similar to the tire 160 of FIG. 4E.

In some embodiments, the centerless wheel assembly 1000 may include a drive gear 1020. The drive gear 1020 may be shaped and/or configured to interface with the teeth 1022 such that rotation of the drive gear 1020 may cause a corresponding rotation of the centerless rim 1010, thus driving the centerless wheel assembly 1000. In some embodiments, the drive gear 1020 may include a first set of teeth 1024 that interface with the teeth 1022 of the rail 1012, and may include a second set of teeth 1026 that may interface with a chain 1035. The chain 1035 may couple the drive gear 1020 with a powered gear 1030. In these and other embodiments, as the powered gear 1030 is rotated, the chain 1035 may cause a corresponding rotation of the drive gear 1020. The powered gear 1030 may be coupled to one or more power sources such as bicycle pedals, a motor drive shaft, an engine, etc. that may cause the powered gear 1030 to rotate. For example, the power source may provide a rotational force and may be coupled to the center of the powered gear 1030.

In some embodiments, the first set of teeth 1024 may proceed about a first outer circumference of the drive gear 1020 and the second set of teeth 1026 may proceed about a second circumference. For example, the drive gear 1020 may function as two gears, one with the first outer circumference and one with the second circumference that are coupled to move as a unitary body. The first circumference and the second circumference may be different sizes to achieve different gearing ratios based on the intended use of the centerless wheel assembly 1000 and a target amount of torque or speed. For example, there may be a first gearing ratio between the first set of teeth 1024 and the centerless rim 1010 and a second gearing ratio between the second set of teeth 1026 and the powered gear 1030. By including both sets of teeth, the two gearing ratios may be independently modified or adjusted by changing the circumference and/or location of the teeth. In some embodiments, the first set of teeth 1024 and the second set of teeth 1026 may have a common circumference such that both sets of teeth are along the outer circumference of the drive gear 1020.

In some embodiments, the drive gear 1020 may be supported by an axle coupled to one or more of the exoskeleton plates (e.g., the exoskeleton plate 1090). In some embodiments, the axle may suspend the drive gear 1020 further towards the middle of the centerless rim 1010 beyond the inner circumference of the exoskeleton plate 1090. Such an embodiment may allow for a lower profile exoskeleton plate 1090 reducing weight, but may come at a cost of potentially reducing aerodynamics by further exposing the rotating drive gear 1020. In these and other embodiments, the location of the drive gear 1020 may be based on the height of the rail 1012 such that the first set of teeth 1024 may interface with the teeth 1022. The height of the rail 1012 may be based on any of a number of factors, including desired braking surface, heat dissipation, material, aerodynamics, etc. In some embodiments, one or more bearings may be coupled to the axle such that the drive gear 1020 may rotate freely about the axle. Additionally or alternatively, one or more one-way bearings may be utilized to couple the drive gear 1020 to the axle or the drive gear 1020 may be keyed to the axle such that as the axle is rotated, the drive gear 1020 is also rotated.

In some embodiments, the drive gear 1020 may be coupled to one or more power sources at the center of the drive gear 1020 rather than through the chain 1035. For example, an output shaft of an electric motor or a drive shaft of an engine may be coupled to the center of the drive gear 1020 such that the rotational force of the output shaft or the drive shaft may cause a corresponding rotation of the drive gear 1020.

Modifications, additions, or omissions may be made to FIG. 10 without departing from the scope of the present disclosure. For example, the centerless wheel assembly 1000 may include more or fewer elements than those illustrated and described in the present disclosure. For example, the centerless wheel assembly 1000 may include any of the components or arrangements consistent with the present disclosure. As another example, the centerless wheel assembly 1000 may exclude the chain 1035 and the powered gear 1030 and include a motor or other power source coupled to the drive gear 1020.

Figure 11:
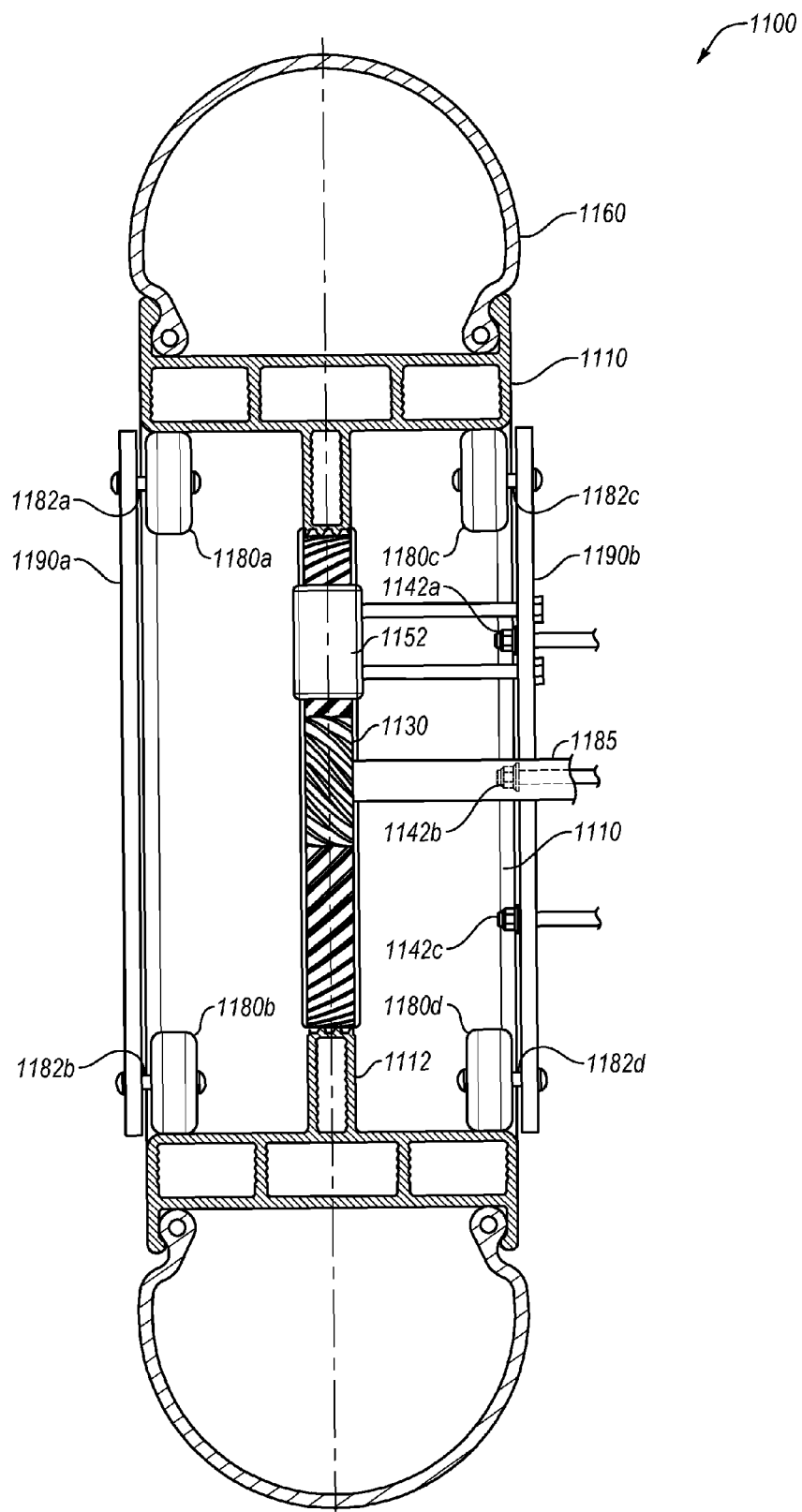
FIG. 11 illustrates a top cutaway view of another example centerless wheel assembly.

FIG. 11 illustrates a top cutaway view of another example centerless wheel assembly 1100, in accordance with one or more embodiments of the present disclosure. For example, the centerless wheel assembly 1100 may be a top view of an example wheel that may be used in an automotive application. The centerless wheel assembly 1100 may include a drive gear 1130 that drives the centerless wheel assembly 1100. The centerless wheel assembly 1100 may also include a brake caliper 1152 for slowing and stopping the centerless wheel assembly 1100.

The centerless wheel assembly 1100 may include a number of components that are comparable or similar to others already described in the present disclosure. For example, exoskeleton plates 1190*a* and 1190*b* may be similar or comparable to the exoskeleton plates 190*a* and 190*b* of FIG. 1A. The centerless wheel assembly 1100 may include a centerless rim 1110 that may be similar or comparable to the centerless rim 410 of FIG. 4E, including a rail 1112 that may be similar or comparable to the rail 412 of FIG. 4E. Additionally, just as the rail 412 includes the portion 450 to function as a brake rotor and interface with a brake caliper 1152, the rail 1112 may include a portion of the rail 1112 that acts as a brake rotor and interfaces with the brake caliper 1152. The brake caliper 1152 may be coupled to one or more of the exoskeleton plates (e.g., the exoskeleton plates 1190*a* and 1190*b*) such that the brake caliper 1152 remains stationary relative to the centerless rim 1110. The centerless wheel assembly 1100 may include the drive gear 1130 that may be similar or comparable to the drive gear 430 of FIG. 4. However, the drive gear 430 may interface with the rail 1112 along a centerline 1102 of the centerless wheel assembly 1100. The drive gear 1130 may be drive by a drive shaft 1185 that may be similar or comparable to the drive shaft 485 of FIG. 4*c*. The centerless wheel assembly 1100 may include one or more roller guides 1180 (e.g., the roller guides 1180*a-d*) that may be similar or comparable to the roller guide 180 of FIG. 1A. The centerless wheel assembly 1100 may include a tire 1160 that may be comparable or similar to the tire 160 of FIG. 4E.

The drive gear 1130 may be driven by the drive shaft 1185 to cause the drive gear 1130 to rotate. Rotation of the drive gear 1130 may cause a corresponding rotation of the centerless rim 1110 due to an interaction between teeth of the drive gear 1130 and teeth of the rail 1112 of the centerless rim 1110. To slow or stop the wheel, the brake caliper 1152 may be invoked to interfere with the portion of the rail 1112 that may operate as a brake rotor.

A first roller guide 1180*a* may be coupled to the first exoskeleton plate 1190*a* using a suspended axle 1182*a*. The suspended axle 1182*a* may be coupled to a single exoskeleton plate (e.g., the exoskeleton plate 1190*a*) rather than bridging between both the exoskeleton plate 1190*a* and 1190*b*. For example, the suspended axle 1182*a* may be cantilevered from one exoskeleton plate 1190*a*. In operation, the suspended axle 1182*a* may function in a similar manner to an axle or bridging shaft that spans between the exoskeleton plates. For example, in these and other embodiments, the first roller guide 1180*b* may be configured to roll freely along the suspended axle 1182*b*. By using the suspended axles 1182*a-d*, the roller guides 1180*a-d* may be used without interfering with the rail 1112. In these and other embodiments, the roller guides 1180*a-d* may include a smaller profile and may not include a gap for the rail as compared to embodiments in which the roller guide spans the rail (e.g., similar or comparable to the roller guide 380 of FIG. 3A).

In some embodiments, the first roller guide 1180*a* may function to maintain the centerless rim 1110 in proper position and alignment such that the drive gear 1130 may maintain consistent contact with the teeth of the rail 1112. In some embodiments, the first roller guide 1180*a* may roll along the centerless rim 1110 during normal operation. Additionally or alternatively, the first roller guide 1180*a* may be configured and/or positioned to roll along the centerless rim 1110 only when there is a force or motion that causes the centerless rim 1110 to deviate from normal operation (e.g., a bump or pothole, torsional forces, chatter, etc.). The other roller guides 1180*b*, 1180*c*, and 1180*d* with their associated suspended axles 1182*b*, 1182*c*, and 1182*d* may operate in a similar or comparable manner to the first roller guide 1180*a* and first suspended axle 1182*a*.

In some embodiments, the roller guides 1180 may be disposed at various locations about the centerless wheel assembly 1100. For example, the roller guides 1180 may be placed at an 8:30, 3:30 and 12:00 position. In these and other embodiments, the roller guides 1180 may be disposed in a symmetrical position about the centerline 1102. For example, if the first roller guide 1180*a* is at an 8:30 position the third roller guide 1180*c* may also be at an 8:30 position. Additionally or alternatively, the first roller guide 1180*a* and the third roller guide 1180*c* may be displaced or staggered from each other. For example, the first roller guide 1180*a* may be at an 8:30 position, the second roller guide 1180*b* may be at 3:30 position, the third roller guide 1180*c* may be at a 9:30 position, and the fourth roller guide 1180*d* may be at a 2:30 position. Any of a variety of factors as described in the present disclosure may influence the placement of the roller guides 1180 about the centerless wheel assembly 1100. For example, the roller guides 1180 may be placed in positions to resist chatter, torsional forces, or other wheel-deforming forces. As another example, the roller guides 1180 may be placed in positions to handle braking forces. As an additional example, the roller guides 1180 may be placed in positions to facilitate removability of the exoskeleton plate 1190.

In some embodiments, the second exoskeleton plate 1190*b* may be coupled to an automotive vehicle using lug nuts 1142. For example, the lug nuts 1142*a*, 1142*b*, and 1142*c* may be disposed at various locations about the second exoskeleton plate 1190*b*. The lug nuts 1142 may couple the centerless wheel assembly 1100 to any component of a vehicle such that the centerless wheel assembly 1100 may provide motion to the vehicle.

Modifications, additions, or omissions may be made to FIG. 11 without departing from the scope of the present disclosure. For example, the centerless wheel assembly 1100 may include more or fewer elements than those illustrated and described in the present disclosure. For example, the centerless wheel assembly 1100 may include any of the components or arrangements consistent with the present disclosure. As another example, the centerless wheel assembly 1100 may include a motor coupled to the drive shaft 1185 to drive the drive gear 1120. As an additional example, there may be additional or fewer roller guides 1180. As another example, the exoskeleton plates 1190*a* and 1190*b* may include an enclosure or covering spanning between the two exoskeleton plates 1190*a* and 1190*b* (e.g., similar or comparable to the exoskeleton plate 390*a* illustrated in FIG. 3A).

Figure 12:
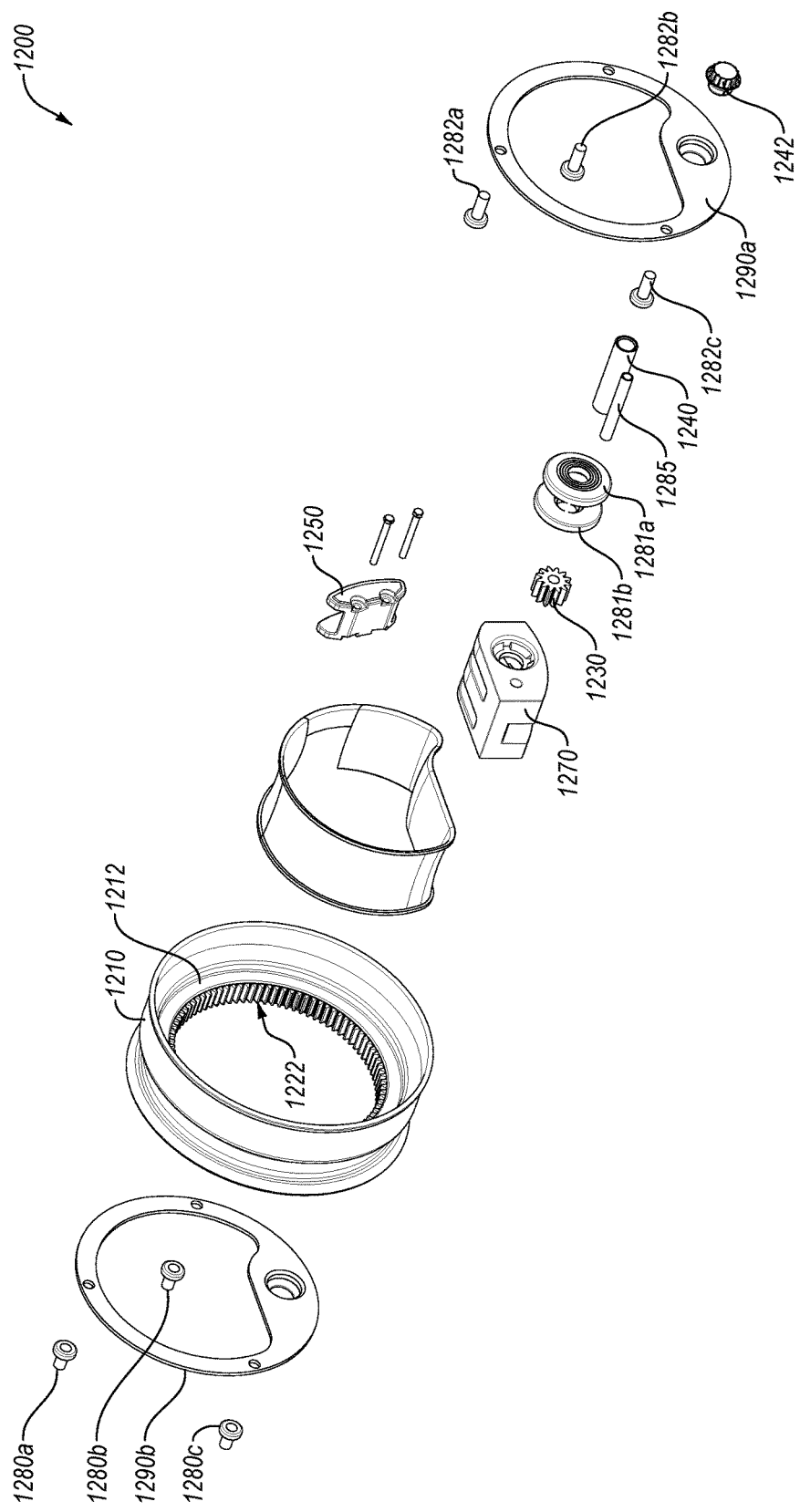
FIG. 12 illustrates an exploded view of an additional example centerless wheel assembly.

FIG. 12 illustrates an exploded view of another example centerless wheel assembly 1200, in accordance with one or more embodiments of the present disclosure. For example, the centerless wheel assembly 1200 may be an example wheel that may be used in an automotive application.

The centerless wheel assembly 1200 may include a number of components that are comparable or similar to others already described in the present disclosure. For example, an exterior exoskeleton plate 1290*a* and an interior exoskeleton plate 1290*b* may be similar or comparable to the exoskeleton plates 190*a* and 190*b* of FIG. 1A. The centerless wheel assembly 1200 may include a centerless rim 1210 that may be similar or comparable to the centerless rim 410 of FIG. 4E, including a rail 1212 that may be similar or comparable to the rail 412 of FIG. 4E. Additionally, just as the rail 412 includes the portion 450 to function as a brake rotor and interface with a brake caliper 1152, the rail 1212 may include a portion of the rail 1212 that acts as a brake rotor and interfaces with a brake caliper 1250. The brake caliper 1250 may be coupled to one or more of the exoskeleton plates (e.g., an interior exoskeleton plate 1290*b*) such that the brake caliper 1250 remains stationary relative to the centerless rim 1210. The centerless wheel assembly 1200 may include a drive gear 1230 that may be similar or comparable to the drive gear 430 of FIG. 4. The drive gear 1230 may be driven by a drive shaft 1285 that may be similar or comparable to the drive shaft 485 of FIG. 4C. The centerless wheel assembly 1200 may include one or more roller guides 1280 (e.g., 1280*a-c*) and/or 1282 (e.g., 1282*a-c*) that may be similar or comparable to the roller guides 1180 of FIG. 11. The centerless wheel assembly 1200 may include a motor 1270 that may be similar or comparable to the motor 170 of FIG. 1A.

The drive gear 1230 may be driven by the drive shaft 1285 to cause the drive gear 1230 to rotate. Rotation of the drive gear 1230 may cause a corresponding rotation of the centerless rim 1210 due to an interaction between teeth of the drive gear 1230 and the teeth 1222 of the rail 1212 of the centerless rim 1210. To slow or stop the wheel, the brake caliper 1250 may be invoked to interfere with the portion of the rail 1212 that may operate as a brake rotor.

In some embodiments, the rail 1212 of the centerless rim 1210 may be offset from the middle of the centerless rim 1210, such that the rail 1212 may be closer to an interior portion of the centerless wheel 1200 (e.g., closer to the body of an automobile) or closer to an exterior portion of the centerless wheel 1200. Moving the rail 1212 closer to the interior portion may provide a force and/or aerodynamic advantage. For example, the rotating driver gear 1230 and/or the teeth 1222 may be further from the exterior air for an automobile in motion.

In some embodiments, the centerless wheel assembly 1200 may include a first set of roller guides 1280 (e.g., the roller guides 1280*a-c*) that may be suspended from the interior exoskeleton plate 1290*b*. The roller guides 1280 may be cantilevered in a similar or comparable manner to the roller guides 1180 of FIG. 11. Additionally or alternatively, a second set of roller guides 1282 (e.g., the roller guides 1282*a-c*) may be cantilevered from the exterior exoskeleton plate 1290*a* in a similar or comparable manner to the roller guides 1180 of FIG. 11. In some embodiments, the second set of roller guides 1282 may be located proximate the exterior exoskeleton plate 1290*a* such that as an automobile goes around a corner or experiences other G-forces that may shift forces towards the exterior exoskeleton plate 1290*a*, the second set of roller guides 1282 may maintain various components of the centerless wheel assembly 1200 in proper position and in proper alignment such that the forces do not derail the driver gear 1230 or otherwise misalign the other components of the centerless wheel 1200.

In some embodiments, the drive shaft 1285 may include a sleeve or bushing 1240. The sleeve or bushing 1240 may include threads or other coupling mechanism such that a hub nut 1242 may screw into or otherwise interface with the sleeve or bushing 1240 to couple the exterior exoskeleton plate 1290*a* to the interior exoskeleton plate 1290*b*. For example, the bushing 1240 may be fixedly coupled to the motor 1270, and the motor 1270 may be fixedly coupled to the interior exoskeleton plate 1290*b*. As another example, the bushing 1240 may be fixedly coupled to the interior exoskeleton plate 1290*b*. In these and other embodiments, removing the hub nut 1242 may allow removal of the exterior exoskeleton plate 1290*a* and/or the centerless rim 1210 by removing only the hub nut 1242.

In some embodiments, the interior exoskeleton plate 1290*b* may include one or more mountings 1291 for coupling the centerless wheel assembly 1200 to an automobile, such as to a c-arm, steering joint, or other vehicular joint. In these and other embodiments, lug nuts or any other coupling mechanism may be used.

In some embodiments, the roller guides 1281*a* and 1281*b* may include bearings such that the roller guides 1281*a* and 1282*b* may rotate freely around the drive shaft 1285. For example, as the drive shaft 1285 is rotated, the drive gear 1230 may rotate with the drive shaft 1285 while the roller guides 1281*a* and 1281*b* may rotate freely about the drive shaft 1285 and/or may roll along an inner surface of the centerless rim 1210.

Modifications, additions, or omissions may be made to FIG. 12 without departing from the scope of the present disclosure. For example, the centerless wheel assembly 1200 may include more or fewer elements than those illustrated and described in the present disclosure. For example, the centerless wheel assembly 1200 may include any of the components or arrangements consistent with the present disclosure. As an additional example, there may be additional or fewer roller guides 1280*a-c*, 1281*a-b*, and 1282*a-c*. As another example, the exoskeleton plates 1290*a* and 1290*b* may include an enclosure or covering spanning between the two exoskeleton plates 1290*a* and 1290*b* (e.g., similar or comparable to the exoskeleton plate 390*a* illustrated in FIG. 3A).

Figure 13A:
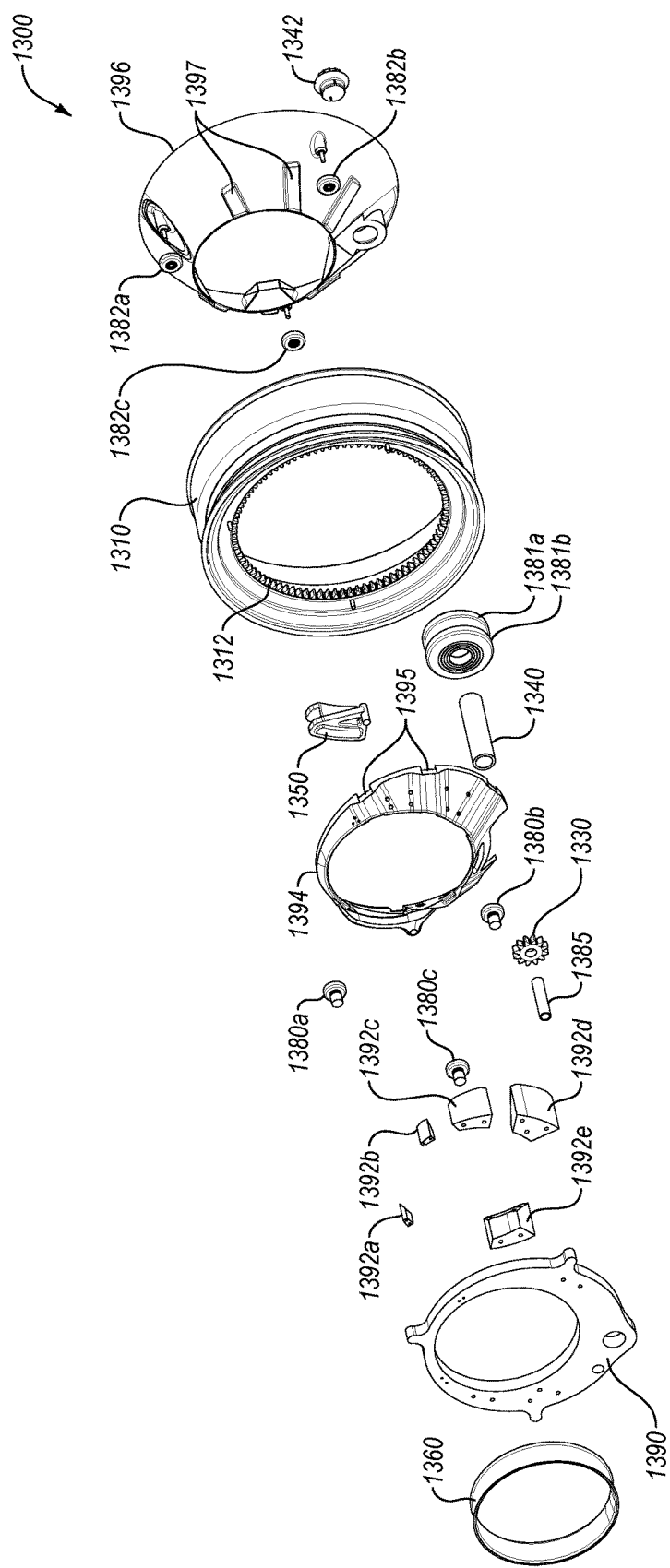
FIG. 13A illustrates an exploded view of another example centerless wheel assembly.
Figure 13B:
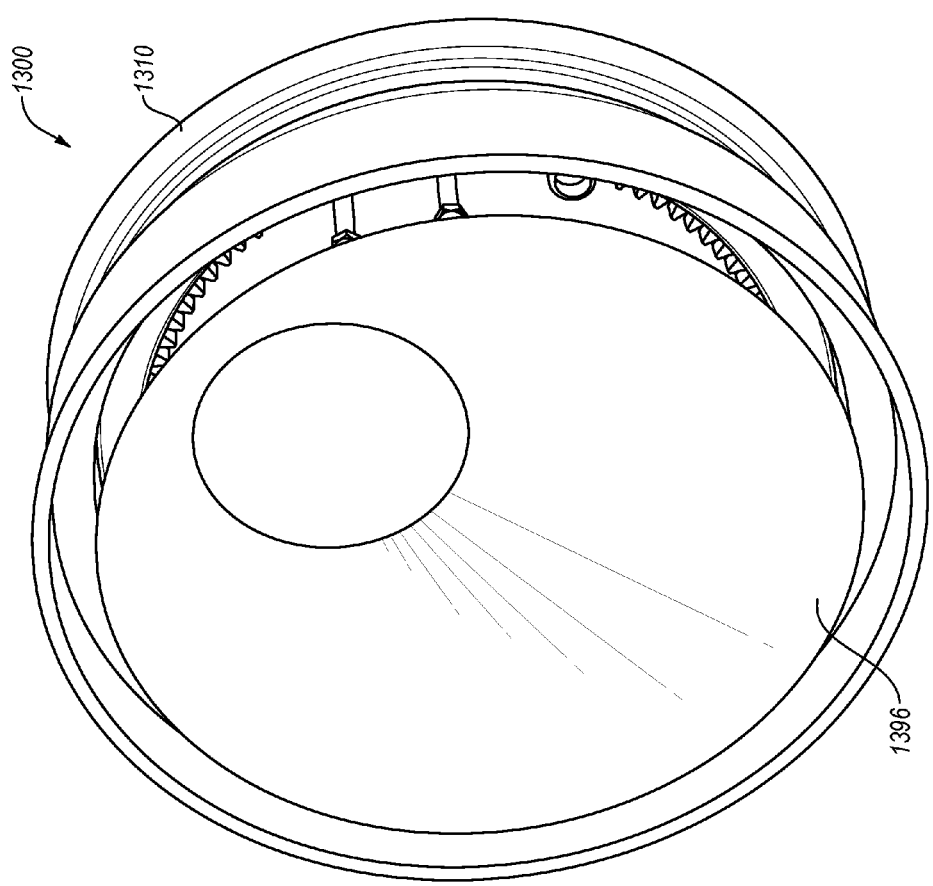
FIG. 13B illustrates a front view of the example centerless wheel assembly of FIG. 13A.

FIGS. 13A and 13B illustrate various view of an example centerless wheel assembly 1300, in accordance with one or more embodiments of the present disclosure. For example, FIG. 13A illustrates an exploded view of the centerless wheel assembly 1300 and FIG. 13B illustrates a front view of the centerless wheel assembly 1300. The centerless wheel assembly 1300 may be comparable or similar to the centerless wheel assembly 1200 of FIG. 12. The centerless wheel assembly 1300 may include an intermediate exoskeleton plate 1394 in addition to an interior exoskeleton plate 1390 and an exterior exoskeleton plate 1396. The exterior exoskeleton plate 1396 may take a customizable view to facilitate visual appeal, aerodynamics, or other design purposes.

The centerless wheel assembly 1300 may include a number of components that are comparable or similar to others already described in the present disclosure. For example, the interior exoskeleton plate 1390 may be similar or comparable to the exoskeleton plates 190*a* and 190*b* of FIG. 1A. The centerless wheel assembly 1300 may include a centerless rim 1310 that may be similar or comparable to the centerless rim 1210 of FIG. 12, including a rail 1312 that may be similar or comparable to the rail 1212 of FIG. 12. Additionally, just as the rail 1212 includes a portion to function as a brake rotor and interface with the brake caliper 1250, the rail 1312 may include a portion of the rail 1312 that acts as a brake rotor and interfaces with a brake caliper 1350. The centerless wheel assembly 1300 may include a drive gear 1330 that may be similar or comparable to the drive gear 1230 of FIG. 12. The drive gear 1330 may be driven by a drive shaft 1385 that may be similar or comparable to the drive shaft 1285 of FIG. 12. The drive shaft 1385 may include a bushing 1340 around the drive shaft 1285 that may be similar or comparable to the bushing 1240 of FIG. 12. The centerless wheel assembly 1300 may include a hub nut 1342 that may be similar or comparable to the hub nut 1242 of FIG. 12. The centerless wheel assembly 1300 may include one or more roller guides 1380 (e.g., 1380*a-c*), 1381 (e.g., 1381*a-b*), and/or 1382 (e.g., 1382*a-c*) that may be similar or comparable to the roller guides 1280*a-c*, 1281*a-b*, and/or 1282*a-c* of FIG. 12.

In some embodiments, the centerless wheel assembly 1300 may include the interior exoskeleton plate 1390 that may be coupled to a vehicle, such as through a c-arm, steering joint, or other mechanical linkage. The interior exoskeleton plate 1390 may be coupled to the intermediate exoskeleton plate 1394. For example, a series of nuts and bolts may couple the interior exoskeleton plate 1390 and the intermediate exoskeleton plate 1394. In these and other embodiments, one or more spacers 1392 (e.g., the spacers 1392*a*-1392*e*) may be used to provide a proper spacing and orientation between the interior exoskeleton plate 1390 and the intermediate exoskeleton plate 1394. For example, the spacers 1392 may be smaller at the top of the centerless wheel assembly 1300 and wider at the bottom of the centerless wheel assembly 1300 to support a generally frustoconical shape of the intermediate exoskeleton plate 1394 with an opening further towards the top of the centerless wheel assembly 1300. In some embodiments, the intermediate exoskeleton plate 1390 may seat directly against the interior exoskeleton plate 1394 and the spacers 1392 may be compressed between the interior exoskeleton plate 1390 and the intermediate exoskeleton plate 1394. In some embodiments, the rail 1312 may be disposed between the interior exoskeleton plate 1390 and the intermediate exoskeleton plate 1394.

In some embodiments, the brake caliper 1350 may be coupled to the intermediate exoskeleton plate 1394. In these and other embodiments, the brake caliper 1350 may be coupled using a movable coupling mechanism, such as a quick-release mechanism (e.g., a release mechanism that is activatable by hand without a tool), a hinged mechanism, or other such coupling mechanism to allow the brake caliper 1350 to be moved away from the rail 1312. In some embodiments, the intermediate exoskeleton plate 1394 may include a gap or void in material for the brake caliper 1350 such that the brake caliper 1350 may be moved into a position such that the brake caliper 1350 remains stationary relative to the rail 1312 and that when the brake caliper 1350 is restricted, the brake caliper interferes with the portion of the rail 1312 that operates as the brake rotor to decrease the rotational speed of the centerless rim 1310.

In some embodiments, the external exoskeleton plate 1396 may operate as a face plate or wind guard to the centerless wheel assembly 1300. For example, the external exoskeleton plate 1396 may include any shape or form factor to facilitate brand recognition, increase aerodynamics, provide an aesthetically appealing appearance, or other factors. For example, the external exoskeleton plate 1396 may include a logo, design, or other mark or shape affiliated with a particular wheel manufacturer or automobile company. As another example, the external exoskeleton plate 1396 may be shaped with a smooth surface to reduce wind resistance. In some embodiments, the external exoskeleton plate 1396 may have voids in material or may be a small ring around the outside of the centerless wheel assembly 1300. In some embodiments, the external exoskeleton plate 1396 may be sized such that an exterior lip of the external exoskeleton plate 1396 may protrude beyond the centerless rim 1310 in one or more directions. For example, the exterior lip of the external exoskeleton plate 1396 may protrude in an exterior direction further than the centerless rim 1310 and/or may protrude in a radial direction away from the center of the centerless rim 1310 beyond the outer circumference of the centerless rim 1310.

In some embodiments, the external exoskeleton plate 1396 may include one or more roller guides 1382 (e.g., the roller guides 1382*a*-*c*) that may be coupled to the external exoskeleton plate 1396. For example, the roller guides 1382 may be cantilevered as described with respect to the roller guides 1180 of FIG. 11.

In some embodiments, the external exoskeleton plate 1396 may be coupled to the bushing 1340 using the hub nut 1342. In these and other embodiments, the external exoskeleton plate 1396 may be removed from the centerless wheel assembly by removal of the hub nut 1342. Additionally or alternatively, after removal of the external exoskeleton plate 1396, the centerless rim 1310 may be removed from the centerless wheel assembly 1300 by moving, releasing, or otherwise adjusting the brake caliper 1350 such that the centerless rim 1310 may proceed externally away from the centerless wheel assembly 1300.

In some embodiments, the external exoskeleton plate 1396 may include one or more raised features 1397 that may interface with one or more depressions 1395 in the intermediate exoskeleton plate 1394. While illustrated as raised features 1397 and depressions 1395 in the external exoskeleton plate 1396 and intermediate exoskeleton plate 1394, respectively, the raised features and the depressions may occur in the other exoskeleton plate as well. Additionally or alternatively, any interfacing feature may be used between the external exoskeleton plate 1396 and intermediate exoskeleton plate 1394 to facilitate a secure centerless wheel assembly 1300. In some embodiments, the external exoskeleton plate 1396 may be coupled to the bushing 1340 that may be coupled to the interior exoskeleton plate 1390, and the interior exoskeleton plate 1390 may be coupled to the intermediate exoskeleton plate 1394. In these and other embodiments, there may be no direct coupling between the exterior exoskeleton plate 1396 and the intermediate exoskeleton plate 1394 besides the interaction of the raised features 1397 and the depressions 1395.

In some embodiments, the centerless wheel assembly 1300 may include a valance 1360 that may be configured to resist rock, sand, dust, or other materials from entering the centerless wheel assembly 1300 proximate the rail 1312. For example, the valence 1360 may be made of a rubber of other material that may straddle the inner circumference of the internal exoskeleton plate 1390, the intermediate exoskeleton plate 1394, and/or the external exoskeleton plate 1396. In some embodiments, the valance 1360 may be made of a rigid material, and in other embodiments, a deformable or stretchable material.

Modifications, additions, or omissions may be made to FIGS. 13A and 13B without departing from the scope of the present disclosure. For example, the centerless wheel assembly 1300 may include more or fewer elements than those illustrated and described in the present disclosure. For example, the centerless wheel assembly 1300 may include any of the components or arrangements consistent with the present disclosure. As an additional example, there may be additional or fewer roller guides 1380*a*-*c*, 1381*a*-*b*, and/or 1382*a*-*c*.

Figure 14A:
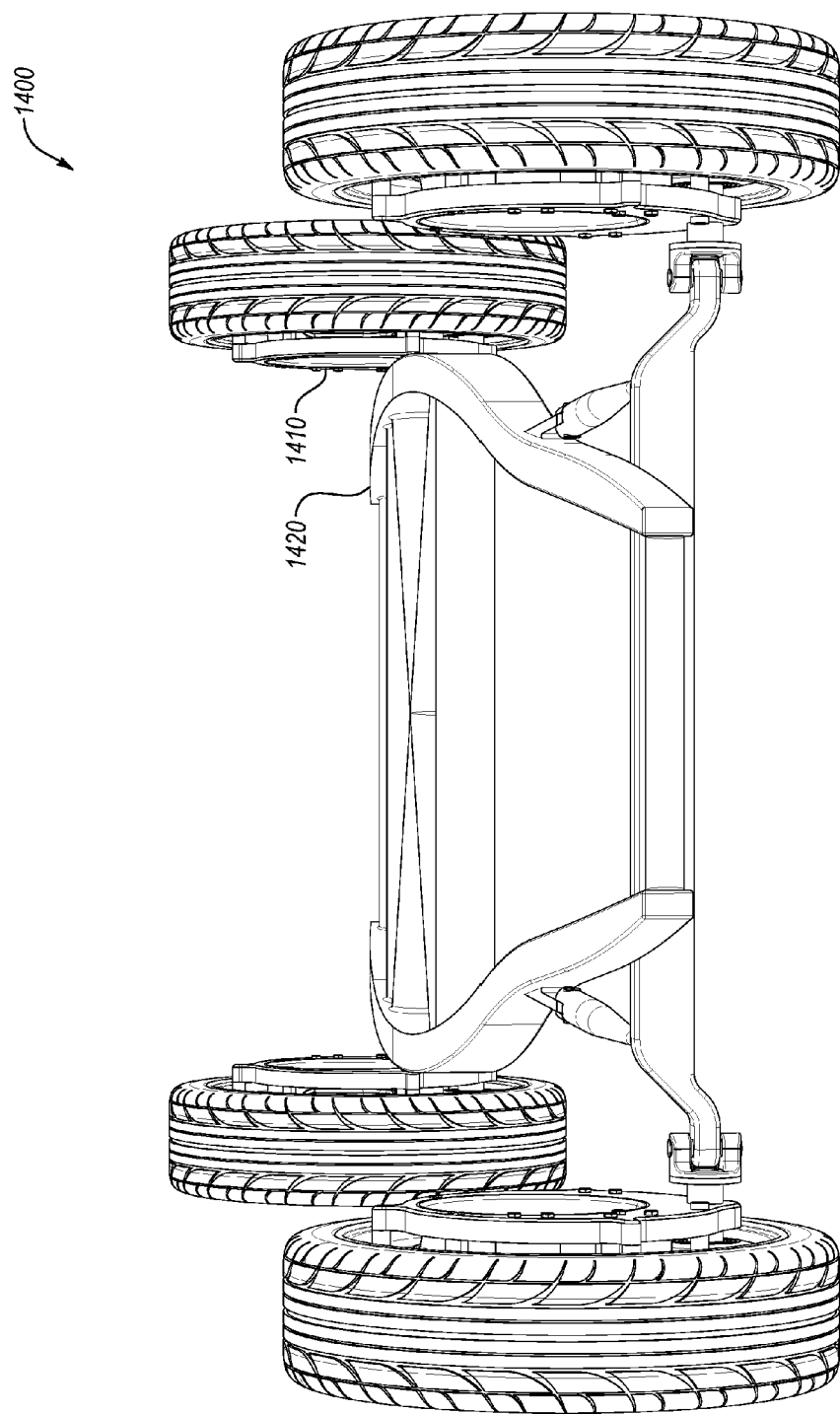
FIG. 14A illustrates a first view of an example vehicle utilizing centerless wheels.

FIGS. 14A and 14 B illustrate multiple views of an example vehicle 1400 utilizing centerless wheels 1410. The centerless wheel assemblies 1410 may be comparable or similar to the centerless wheel assembly 1300 of FIGS. 13A and/or 13B.

In some embodiments, the centerless wheel assemblies 1410 may be coupled to a vehicle chassis 1420. For example, the chassis 1420 may include a half shaft, arm, cantilevered member, etc. to which the centerless wheel 1410 may be coupled. In some embodiments, a single lug nut may couple the centerless wheel 1410 to the chassis 1420.

Figure 14B:
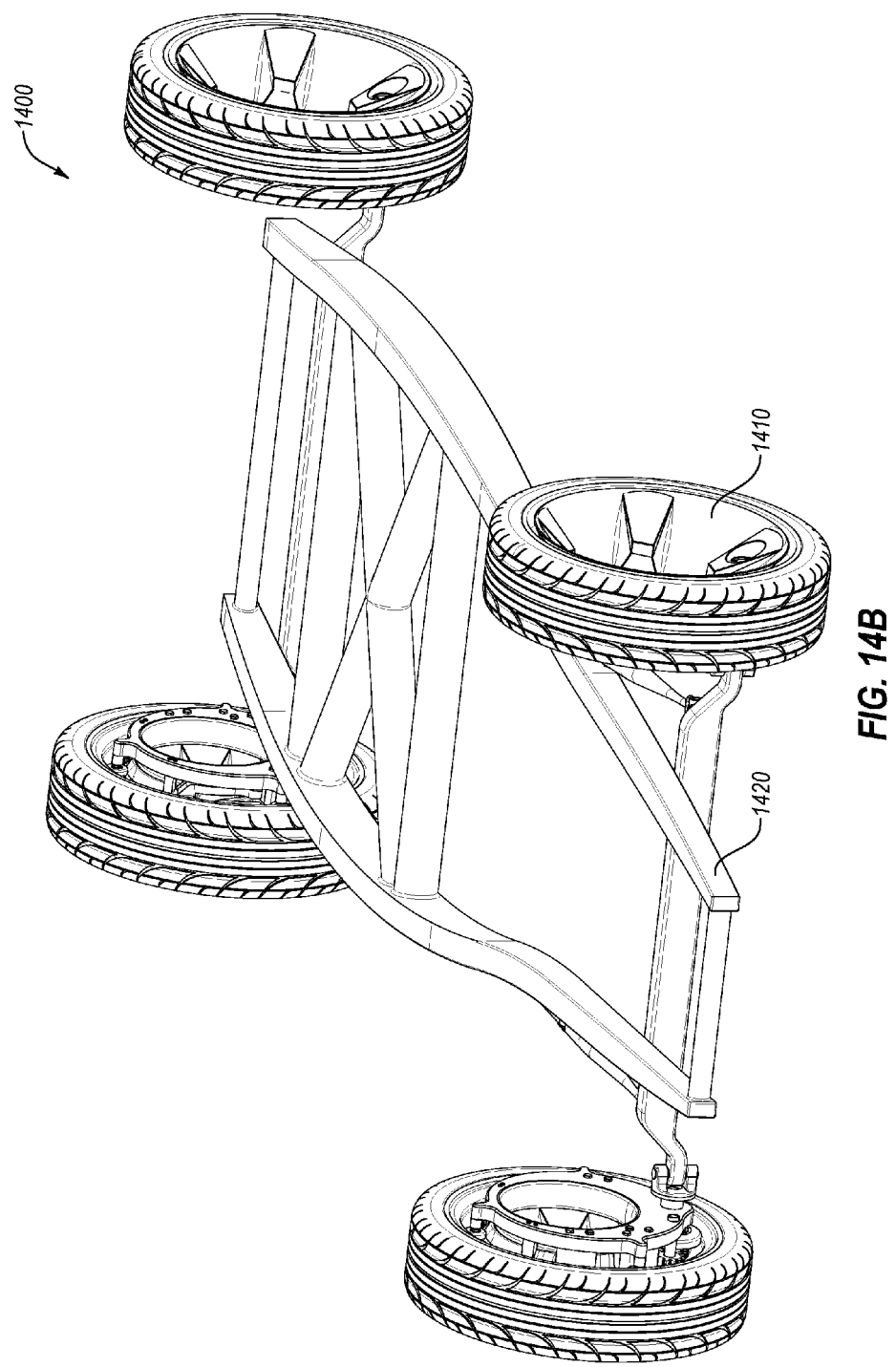
FIG. 14B illustrates a second view of the example vehicle of FIG. 14A.

Modifications, additions, or omissions may be made to FIGS. 14A and 14B without departing from the scope of the present disclosure. For example, the vehicle 1400 may include more or fewer elements than those illustrated and described in the present disclosure. For example, the vehicle 1400 may include any of the components or arrangements consistent with the present disclosure. As an additional example, there may be any of a variety of coupling members to couple the centerless wheels 1410 to the chassis 1420. As an another example, the vehicle 1400 may include a body on top of the chassis 1420 such as a cargo area, a seating area, an engine or motor area, etc.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A centerless wheel assembly comprising:
   a centerless rim including a first center point laying in a first plane generally defined by the centerless rim; and
   a centerless ring gear coupled to the centerless rim such that rotation of the centerless ring gear causes a corresponding rotation of the centerless rim, the centerless ring gear including a second center point laying in a second plane generally defined by the centerless ring gear, the first plane being generally parallel to the second plane, the centerless ring gear shaped to interface with a drive gear that drives the centerless ring gear;
   wherein the centerless ring gear is offset from the centerless rim in a direction parallel to the first plane to account for imperfections in circularity in one or both of the centerless rim and the centerless ring gear.

2. The centerless wheel assembly of claim 1, wherein the offset is located at a place along a circumference of the centerless rim corresponding to a greatest imperfection in circularity and a size of the offset corresponds to a size of the greatest imperfection in circularity.

3. The centerless wheel assembly of claim 1, further comprising a roller guide with a profile that matches a profile of the centerless rim such that the roller guide rolls along an inner circumference of the centerless rim as the centerless rim rotates.

4. The centerless wheel assembly of claim 3, wherein the profile of the centerless rim includes a rail extending towards the first center point and the profile of the roller guide includes a gap for the rail and the roller guide is shaped to leave space between the roller guide and the rail during normal rotation of the centerless wheel assembly.

5. The centerless wheel assembly of claim 3, further comprising an exoskeleton plate including a first portion and a second portion, the roller guide supported by a shaft acting as an axle for the roller guide and the drive gear, the shaft spanning between the first portion and the second portion of the exoskeleton plate.

6. The centerless wheel assembly of claim 1, further comprising a tire coupled to the centerless rim and concentric with the centerless rim, the tire shaped and configured to contact and roll along ground, and the centerless ring gear shaped and configured to not contact the ground during normal rotation of the centerless wheel assembly due to a circumference of the centerless ring gear being smaller than a circumference of the tire.

7. The centerless wheel assembly of claim 1, further comprising a bushing around at least one or more bolts coupling the centerless ring gear to the centerless rim, the bushing allowing motion between the centerless ring gear and the centerless rim based on imperfections in circularity in one or both of the centerless rim and the centerless ring gear.

8. The centerless wheel assembly of claim 1, wherein the first center point and the second center point lie on a line that is approximately perpendicular to the first plane.

9. The centerless wheel assembly of claim 1, wherein the centerless ring gear includes a helical gear.

10. The centerless wheel assembly of claim 1, further comprising a brake rotor coupled to the centerless rim, the brake rotor including a third center point and defining a third plane, the third plane being generally parallel with the first plane.

11. The centerless wheel assembly of claim 10, wherein the brake rotor is on an opposite side of the centerless rim from the centerless ring gear.

12. The centerless wheel assembly of claim 10, wherein the first center point and the third center point lie on a line that is approximately perpendicular to the first plane.

13. The centerless wheel assembly of claim 10, wherein the centerless ring gear and the brake rotor are part of a single body.

14. The centerless wheel assembly of claim 1, wherein the centerless rim is composed of a material to function as a heat sink to dissipate heat away from the centerless ring gear.

15. A centerless wheel assembly, the centerless wheel assembly comprising:
- a centerless rim including a first center point laying in a first plane generally defined by the centerless rim and composed of a material to function as a heat sink to draw heat away from other components of the centerless wheel assembly;
- a centerless ring gear coupled to the centerless rim such that rotation of the centerless ring gear causes a corresponding rotation of the centerless rim, the centerless ring gear including a second center point laying in a second plane generally defined by the centerless ring gear, the first plane being generally parallel to the second plane, the centerless ring gear shaped to interface with a drive gear that drives the centerless ring gear, the second center point offset from a line that is approximately perpendicular to the first plane in a direction parallel to the first plane and of a greatest imperfection in circularity of the centerless rim and by an amount to offset the greatest imperfection in circularity of the centerless rim;
- a plurality of bushings between the centerless rim and the centerless ring gear to allow motion between the centerless rim and the centerless ring gear based on imperfections in circularity of one or both of the centerless rim and the centerless ring gear;
- a brake rotor coupled to the centerless rim, the brake rotor defining a third plane with a third center point, the third plane generally parallel to the first plane, the third center point offset from the line that is approximately perpendicular to the first plane in the direction and by the amount;
- an exoskeleton plate with a first portion and a second portion;
- a plurality of roller guides shaped to roll along an inner circumference of the centerless rim and suspended between the first portion and the second portion of the exoskeleton plate, at least one of the plurality of roller guides at a six o'clock position; and
- a drive gear interfaced with the centerless ring gear, the drive gear coupled to the exoskeleton plate.

16. The centerless wheel assembly of claim 15, further comprising a motor mounted on the exoskeleton plate and driving the drive gear.

17. The centerless wheel assembly of claim 15, wherein the centerless ring gear and the brake rotor are part of a single body.

18. The centerless wheel assembly of claim 15, wherein the centerless ring gear and the brake rotor are coupled to opposite sides of the centerless rim.

19. The centerless wheel assembly of claim 15, further comprising:
- a drive shaft spanning the first portion and the second portion of the exoskeleton plate and acting as an axle for a first roller guide of the plurality of roller guides;
- bearings coupling the drive shaft to the first roller guide such that first roller guide rotates freely about the drive shaft; and
- one way bearings coupling the drive shaft to the drive gear such that rotation of the drive shaft causes a corresponding rotation of the drive gear.

* * * * *